(12) United States Patent
Karamcheti et al.

(10) Patent No.: US 9,733,840 B2
(45) Date of Patent: *Aug. 15, 2017

(54) MANAGING THE WRITE PERFORMANCE OF AN ASYMMETRIC MEMORY SYSTEM

(71) Applicant: Virident Systems Inc., Milpitas, CA (US)

(72) Inventors: Vijay Karamcheti, Palo Alto, CA (US); Ashish Singhai, Cupertino, CA (US); Shibabrata Mondal, Bangalore (IN); Ajith Kumar, Bangalore (IN)

(73) Assignee: VIRIDENT SYSTEMS, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,740

(22) Filed: Oct. 24, 2016

(65) Prior Publication Data

US 2017/0038981 A1    Feb. 9, 2017

Related U.S. Application Data

(60) Continuation of application No. 14/852,844, filed on Sep. 14, 2015, now Pat. No. 9,477,595, which is a
(Continued)

(51) Int. Cl.
    *G06F 12/02*     (2006.01)
    *G06F 3/06*     (2006.01)
(Continued)

(52) U.S. Cl.
    CPC ............ *G06F 3/061* (2013.01); *G06F 3/0611* (2013.01); *G06F 3/0655* (2013.01);
(Continued)

(58) Field of Classification Search
    CPC ..................... G06F 12/0246; G06F 2212/7208
    See application file for complete search history.

(56) References Cited

U.S. PATENT DOCUMENTS

| 3,363,240 A | 1/1968 | Cola et al. |
|---|---|---|
| 5,276,835 A | 1/1994 | Mohan et al. |

(Continued)

FOREIGN PATENT DOCUMENTS

| WO | WO 2012/096652 | 7/2012 |
|---|---|---|
| WO | WO 2012/100087 | 7/2012 |

OTHER PUBLICATIONS

U.S. Non-Final Office Action for U.S. Appl. No. 13/838,699 dated Apr. 7, 2015, 19 pages.
(Continued)

*Primary Examiner* — Aracelis Ruiz
(74) *Attorney, Agent, or Firm* — Patterson & Sheridan, LLP

(57) ABSTRACT

Some implementations include a method of managing a hosted non-volatile random-access memory (NVRAM) based storage subsystem that includes NVRAM devices. The method includes: receiving, at a device driver on the host computing device, write requests each requesting to write a respective unit of data to the NVRAM-based storage subsystem; categorizing the write requests into subgroups of write requests, where write requests within respective subgroups are mutually exclusive; ascertaining a load condition of each of several of the NVRAM devices of the NVRAM-based storage subsystem; identifying a target location on at least one NVRAM device to service a particular subgroup of write requests according to the ascertained load conditions of the NVRAM devices of the NVRAM-based storage subsystem; and servicing the particular subgroup of write requests by writing the corresponding units of data to the identified target location on the at least one NVRAM device of the NVRAM-based storage subsystem.

25 Claims, 9 Drawing Sheets

Related U.S. Application Data continuation of application No. 13/927,871, filed on Jun. 26, 2013, now Pat. No. 9,164,891, which is a division of application No. 13/838,699, filed on Mar. 15, 2013.

(51) Int. Cl.
    *G06F 9/48*     (2006.01)
    *G06F 9/50*     (2006.01)

(52) U.S. Cl.
    CPC .......... *G06F 3/0659* (2013.01); *G06F 3/0679* (2013.01); *G06F 3/0688* (2013.01); *G06F 9/4881* (2013.01); *G06F 9/5016* (2013.01); *G06F 12/0246* (2013.01); *G06F 2212/7206* (2013.01); *G06F 2212/7208* (2013.01)

(56) References Cited

U.S. PATENT DOCUMENTS

| | | |
|---|---|---|
| 5,734,861 A | 3/1998 | Cohn et al. |
| 5,787,466 A | 7/1998 | Berliner |
| 6,018,779 A | 1/2000 | Blumenau |
| 6,785,169 B1 | 8/2004 | Nemati et al. |
| 6,895,490 B1 | 5/2005 | Moore et al. |
| 7,370,143 B1 | 5/2008 | Scott et al. |
| 7,613,870 B2 | 11/2009 | Bartley et al. |
| 7,930,513 B2 | 4/2011 | Karamcheti |
| 7,971,093 B1 | 6/2011 | Goel |
| 8,055,873 B2 | 11/2011 | Chu |
| 8,156,299 B2 | 4/2012 | Okin et al. |
| 8,239,617 B1 | 8/2012 | Linnell |
| 8,352,673 B2 | 1/2013 | Chu |
| 8,452,929 B2 | 5/2013 | Bennett |
| 8,621,145 B1 | 12/2013 | Kimmel |
| 8,626,987 B2 | 1/2014 | Jung et al. |
| 8,688,896 B2 | 4/2014 | Nakamura et al. |
| 8,719,488 B2 | 5/2014 | Maheshwari |
| 8,756,375 B2 | 6/2014 | Flynn |
| 9,122,588 B1 | 9/2015 | Mondal |
| 2004/0094778 A1 | 5/2004 | Ooishi |
| 2005/0022051 A1 | 1/2005 | Zane et al. |
| 2005/0041449 A1 | 2/2005 | Houston |
| 2005/0289197 A1 | 12/2005 | Kan |
| 2006/0075156 A1 | 4/2006 | Okski |
| 2006/0155917 A1 | 7/2006 | Di Sena et al. |
| 2006/0274566 A1 | 12/2006 | Takashima et al. |
| 2007/0294490 A1* | 12/2007 | Freitas ............... G06F 12/0246 711/154 |
| 2009/0019218 A1 | 1/2009 | Sinclair |
| 2009/0157989 A1 | 6/2009 | Karamcheti et al. |
| 2009/0172263 A1 | 7/2009 | Olbrich |
| 2009/0198874 A1 | 8/2009 | Tzeng |
| 2009/0313417 A1 | 12/2009 | Wan |
| 2010/0070729 A1 | 3/2010 | Ng et al. |
| 2010/0262773 A1 | 10/2010 | Borchers et al. |
| 2011/0167192 A1 | 7/2011 | Lyer et al. |
| 2011/0239064 A1 | 9/2011 | Byom et al. |
| 2012/0079353 A1 | 3/2012 | Lilkanen et al. |
| 2012/0198138 A1 | 8/2012 | Okin et al. |
| 2012/0217549 A1 | 8/2012 | Widjaja |
| 2013/0019057 A1 | 1/2013 | Stephens |
| 2013/0054853 A1 | 2/2013 | Wang et al. |
| 2013/0054873 A1 | 2/2013 | Belluomini et al. |
| 2013/0297852 A1 | 11/2013 | Fai |
| 2013/0297880 A1 | 11/2013 | Flynn |
| 2014/0068182 A1 | 3/2014 | Terry |
| 2014/0181364 A1 | 6/2014 | Berke |
| 2014/0281121 A1 | 9/2014 | Karamcheti et al. |
| 2014/0281133 A1 | 9/2014 | Karamcheti |
| 2014/0281138 A1 | 9/2014 | Karamcheti et al. |
| 2014/0281152 A1 | 9/2014 | Karamcheti |
| 2015/0193144 A1 | 7/2015 | Bilas |
| 2015/0331806 A1 | 11/2015 | Mondal et al. |
| 2016/0004612 A1 | 1/2016 | Karamcheti et al. |
| 2016/0004635 A1 | 1/2016 | Karamcheti et al. |

OTHER PUBLICATIONS

U.S. Non-Final Office Action for U.S. Appl. No. 13/927,740 dated Feb. 12, 2015, 34 pages.
International Search Report and Written Opinion in International Application No. PCT/US2014/029053, mailed Aug. 27, 2014, 11 pages.
U.S. Non-Final Office Action for U.S. Appl. No. 13/927,871 dated Feb. 13, 2015, 39 pages.
U.S. Notice of Allowance for U.S. Appl. No. 13/927,871 dated Jun. 15, 2015, 14 pages.
U.S. Non-Final Office Action for U.S. Appl. No. 14/852,844 dated Oct. 27, 2015, 14 pages.
U.S. Final Office Action for U.S. Appl. No. 14/852,844 dated Feb. 16, 2016, 12 pages.
U.S. Notice of Allowance for U.S. Appl. No. 14/852,844 dated Jun. 22, 2016, 8 pages.
"Grubb's test for outliers". Wikipedia: The Free Encyclopedia. Wikimedia Foundation, Inc. Feb. 5, 2013. Web Oct. 30, 2014 https://en.wikipedia.org/wiki/Grubbs%27_test_for_outliers.
Cassuto et al., "Codes for asymmetric limited-magnitude errors with application to multi-level flash memories," Retrieved Feb. 3, 2017, from http://www.paradise.caltech.edu/papers/etr088.pdf, 15 pages.
Extended European Search Report for Application No. 14763754.0, dated Jan. 4, 2017, 7 pages.
Extended European Search Report for Application No. 14768560.6, dated Oct. 31, 2016, 8 pages.
International Search Report and Written Opinion in International Application No. PCT/US2014/026773, mailed Aug. 11, 2014, 7 pages.
U.S. Final Office Action for U.S. Appl. No. 13/838,699, dated Oct. 8, 2015, 25 pages.
U.S. Final Office Action for U.S. Appl. No. 13/927,740, dated Aug. 28, 2015, 44 pages.
U.S. Non-Final Office Action for U.S. Appl. No. 13/841,706 dated Apr. 24, 2015, 10 pages.
U.S. Non-Final Office Action for U.S. Appl. No. 13/843,714, dated Dec. 5, 2014, 16 pages.
U.S. Notice of Allowance for U.S. Appl. No. 13/841,706 dated Nov. 3, 2015, 7 pages.
U.S. Notice of Allowance for U.S. Appl. No. 13/842,940 dated Nov. 21, 2014, 9 pages.
U.S. Notice of Allowance for U.S. Appl. No. 13/843,511 dated Dec. 16, 2014, 9 pages.
U.S. Notice of Allowance for U.S. Appl. No. 13/843,714, dated Apr. 27, 2015, 10 pages.
U.S. Notice of Allowance for U.S. Appl. No. 13/927,740, dated Dec. 18, 2015, 10 pages.
U.S. Notice of Allowance for U.S. Appl. No. 14/667,804 dated Nov. 27, 2015, 13 pages.

* cited by examiner

MANAGING THE WRITE PERFORMANCE OF AN ASYMMETRIC MEMORY SYSTEM

CROSS-REFERENCE TO RELATED APPLICATIONS

This application is a continuation (and claims the benefit of priority under 35 USC §120) of U.S. application Ser. No. 14/852,844, filed Sep. 14, 2015, now U.S. Pat. No. 9,477,595, which is a continuation of U.S. application Ser. No. 13/927,871, filed Jun. 26, 2013, now U.S. Pat. No. 9,164,891, issued Oct. 20, 2015, which is a divisional of U.S. application Ser. No. 13/838,699, filed Mar. 15, 2013. The disclosures of the prior applications are considered part of (and are incorporated by reference in) the disclosure of this application.

TECHNICAL FIELD

This document generally relates to managing write performance in an asymmetric memory system.

BACKGROUND

Computer systems typically use memory modules for storing data. Some of the memory modules are realized by memory cards that include non-volatile computer memory, such as flash memory.

SUMMARY

The present disclosure describes methods and systems for managing the write performance of an non-volatile random access memory (NVRAM)-based storage subsystem.

In one aspect, some implementations include a method of managing a hosted non-volatile random-access memory (NVRAM) based storage subsystem that includes NVRAM devices. The method includes: receiving, at a device driver on the host computing device, write requests each requesting to write a respective unit of data to the NVRAM-based storage subsystem; categorizing the write requests into subgroups of write requests, where write requests within respective subgroups are mutually exclusive; ascertaining a load condition of each of several of the NVRAM devices of the NVRAM-based storage subsystem; identifying a target location on at least one NVRAM device to service a particular subgroup of write requests according to the ascertained load conditions of the NVRAM devices of the NVRAM-based storage subsystem; and servicing the particular subgroup of write requests by writing the corresponding units of data to the identified target location on the at least one NVRAM device of the NVRAM-based storage subsystem.

Implementations may include one or more of the following features. Servicing the particular subgroup of write requests may include writing the respective unit of data of a first write request categorized in one of the subgroup of write requests at a first target location and writing the respective unit of data of a second write request categorized in one other of the subgroup of write requests at a second target location, where the first and second target locations are separated by a distance of memory locations within which data is otherwise stored prior to writing the respective units of data of the first and second write requests.

Servicing the particular subgroup of write requests may further include projecting the corresponding unit of data of the write requests categorized within a first subgroup of write requests to have a first distribution of validity durations after being written and projecting the corresponding units of data of the write requests categorized within a second subgroup of write requests to have a second distribution of validity durations after being written, wherein the first distribution and the second distribution differ from each other statistically. A number of heuristics or statistical test may be used to determine whether two distributions are statistically different, for example, student t-test, ANOVA, etc.

Categorizing the write requests into subgroups of write requests may include generating a first subgroup of write requests with a first size distribution of the respective units of data; generating a second subgroup of write requests with a second size distribution of the respective units of data, wherein the first size distribution and the second size distribution differ from each other statistically.

Categorizing the write requests into subgroups of write requests may include generating a first subgroup of write requests received at the device driver at a first arrival time distribution; generating a second subgroup of write requests received at the device driver at a second arrival time distribution, wherein the first arrival time distribution and the second arrival time distribution differ from each other statistically.

Categorizing the write requests into subgroups of write requests may include generating a particular subgroup of write requests that are from one group of threads associated with a particular application on a computing device hosting the NVRAM-based storage system.

Categorizing the write requests into subgroups of write requests may include categorizing the write requests into a first subgroup of write requests and a second subgroup of write requests, and wherein the write requests in the first subgroup request to write respective units of data that are faster changing than respective units of data of write requests in the second subgroup.

The method may further include: improving a write amplification overhead caused by writing the respective units of data for the plurality of write requests to the NVRAM-based storage subsystem. improving the write amplification overhead may include reducing, by categorizing the received write requests, an aggregate amount of data that has been relocated, wherein data is relocated to release at least one location on the at least one NVRAM device in order for the NVRAM-based storage subsystem to service at least one write request arriving after the plurality of I/O access requests have been received.

The method may additionally include choosing, from a pool of candidate erase blocks, an active erase block that comprises more than one write pages to accommodate a respective unit of data of a particular write request. Choosing the active erase block may be based on an amount of valid data on each of the candidate erase blocks. Choosing the active erase block may be based on a load distribution across the active erase blocks. Choosing the active erase block may be based on an expected lifetime of the respective unit of data of the particular write request.

The method may further include: tracking an erase count for each of the candidate erase blocks in the pool of candidate erase blocks, wherein the erase count indicates a number of times the erase block has undergone an erase operation. The method may additionally include: in response to the erase count of a candidate erase block indicating that the candidate erase block has underwent less than 50% of an average erase operations of the pool of candidate erase blocks, choosing the erase block to accommodate the respective write page of data.

The method may further include tracking a utilization of a hardware resource associated with each candidate erase block, wherein choosing the active erase block causes respective utilizations of all candidate erase blocks to become less divergent from each other. The hardware resource may include a direct memory access (DMA) channel adapted to perform read and write operations on the active erase block chosen from the pool of candidate erase blocks.

Categorizing the plurality of write requests into subgroups of write requests comprises determining whether a particular write request of the plurality of write requests is latency sensitive or throughput-sensitive. A write request may be latency-sensitive when the write request is to be serviced upon receipt. A write request is throughput-sensitive when the respective unit of data is to be written with confirmation. Determining whether the particular write requests is latency sensitive or throughput sensitive may further include: ascertaining a block size of the respective unit of data to be written per the particular write request; and identifying an application process or thread that has issued the write request.

The method may further include: based on determining that the particular write request is latency sensitive, scheduling the particular write request as an asynchronous write to the NVRAM-based storage subsystem, wherein the asynchronous writes are carried out by sending the respective units of data to the intermediate volatile storage and without confirming that the respective units of data of the write requests have been completely written to the target locations on the at least one NVRAM device of the NVRAM-based storage subsystem; and based on determining that the particular write request is throughput sensitive, scheduling the particular write request as a synchronous write to the NVRAM-based storage subsystem, wherein the synchronous writes are performed by blocking application processes or threads on the host computing device that have issued the write requests until the respective units of data have been completely written to the at least one NVRAM device of the NVRAM-based storage subsystem.

A respective unit of data of a write request determined as latency-sensitive may be smaller in size than a respective unit of data of a write request determined as throughput-sensitive, wherein a subgroup of write requests categorized as latency-sensitive may include write requests issued by a first set of application processes or threads on the host computing device, wherein a subgroup of write requests categorized as throughput-sensitive may include write requests issued by a second set of application processes or threads on the host computing device, and wherein the first set of application processes or threads may be smaller in size than the second set of application processes or threads.

A respective unit of data of a write request determined as throughput-sensitive may be larger in size than a respective unit of data of a write request determined as latency-sensitive. A subgroup of write requests categorized as latency-sensitive may include write requests issued by a first set of application processes or threads on the host computing device. A subgroup of write requests categorized as throughput-sensitive may include write requests issued by a second set of application processes or threads on the host computing device. The second set of application processes or threads are substantially larger in size than the first set of application processes or threads.

The method may further include: comparing the ascertained load condition to a load threshold, based on the comparison yielding that the ascertained load condition is within a load threshold, writing the corresponding units of data as asynchronous writes through an intermediate volatile storage on the NVRAM-based storage subsystem, wherein the asynchronous writes may be carried out by sending the respective units of data to the intermediate volatile storage and without confirming that the respective units of data of the write requests have been completely written to the target locations on the at least one NVRAM device of the NVRAM-based storage subsystem; and based on the comparison yielding that the ascertained load condition is above the load threshold, writing the corresponding units of data as synchronous writes through the intermediate volatile storage on the NVRAM-based storage subsystem or bypassing the intermediate volatile storage on the NVRAM-based storage subsystem, wherein the synchronous writes are performed by blocking application processes or threads on the host computing device that have issued the write requests until the respective units of data have been completely written to the at least one NVRAM device of the NVRAM-based storage subsystem.

Ascertaining the load condition of the least one NVRAM device of the NVRAM-based storage subsystem may include determining at least one of: a number of pending input/output (I/O) access requests at the at least one NVRAM device, a number of application processes or threads with I/O access backlogs, an availability of physical cells on the at least one NVRAM device, or a queue occupancy ratio of pending write requests.

The queue occupancy ratio may be directed to a queue of pending write requests at a controller on the at least one NVRAM device or a queue of pending write requests at a device driver on a host computing device on which the at least one NVRAM device is mounted. The queue occupancy ratio may detect whether a particular queue of write requests has more than a threshold number of entries.

In another aspect, some implementations include a system that includes a non-volatile random-access memory (NVRAM) based storage subsystem. The NVRAM-based storage subsystem includes at least one NVRAM device, wherein the NVRAM-based storage subsystem is in communication with a host computing device, and wherein the NVRAM-based storage subsystem is configured to: receive, from the host computing device, write requests, each requesting to write respective unit of data to the NVRAM-based storage subsystem, wherein the NVRAM-based storage subsystem includes at least one NVRAM device; categorize the write requests into subgroups of write requests, where write requests within respective subgroups are mutually exclusive; ascertain a load condition one of each of several of the NVRAM devices of the NVRAM-based storage subsystem; identify a target location on at least one NVRAM device to service a particular subgroup of write requests according to the ascertained load condition of the at least one NVRAM device of the NVRAM-based storage subsystem; and service the particular subgroup of write requests by writing the corresponding units of data to the identified target locations on the last least one NVRAM device.

Implementations may include one or more of the following features. The NVRAM-based storage subsystem may further include an intermediate volatile storage on the at least one NVRAM device and a controller-provided logic guarantee mechanism, and wherein the controller-provided logic guarantee mechanism may write data contents in the intermediate volatile memory to flash media on the at least one NVRAM device in case of an unplanned power outage at the NVRAM-based storage subsystem.

The NVRAM-based storage subsystem may be further configured to: compare the ascertained load condition to a load threshold; based on the comparison yielding that the ascertained load condition is within a load threshold, write the corresponding units of data as asynchronous writes through the intermediate volatile storage on the NVRAM-based storage subsystem, wherein the asynchronous writes may be carried out by sending the respective units of data to the intermediate volatile storage and without confirming that the respective units of data of the write requests have been completely written to the target locations on the at least one NVRAM device of the NVRAM-based storage subsystem device; and based on the comparison yielding that the ascertained load condition is above the load threshold, write the corresponding units of data as synchronous writes through the intermediate volatile storage on the NVRAM-based storage subsystem device or bypassing the intermediate volatile storage on the NVRAM-based storage subsystem, wherein the synchronous writes are performed by blocking the respective processes or threads on the host computing device issued the write requests until the respective units of data have been completely written to the at least one NVRAM device of the NVRAM-based storage subsystem. The NVRAM-based storage subsystem may further include direct memory access (DMA) channels adapted to service the write requests.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1A:
FIG. 1A is a diagram illustrating a host computing device and a NVRAM in accordance with some implementations.

Non-volatile memory devices, such as NOR and NAND flash devices, may be configured to act as storage-class devices used for enterprise data storage and Internet data center applications. Such data storage applications may include, for example, back-up file servers, large database application to respond to user queries, distributed directory services to provide on-line white-page service, and other applications associated with cloud computing to provide some form of cloud service. In some data storage applications, the NOR and NAND flash devices may serve as adjuncts to mechanical rotating media storage devices.

In contrast to SRAM or DRAM, these non-volatile memory devices (NVMDs) do not require constant refreshing currents to hold data contents stored on the flash media memory cells. For example, the NVMDs can hold data contents for decades without refreshing currents. On the other hand, data contents stored on these NVMD devices may or may not be accessed with granularity for other types of memory (such as the volatile memory). Two types of flash memories have been mentioned above, namely NAND and NOR. These two types of flash memories have different underlying logic gate arrangement of each cell. NAND flash memory may be written and read in blocks (or pages) which are generally much smaller than the size of the entire device but substantially larger than a single byte. In comparison, NOR flash memory may allow a single machine word (byte) to be written or read independently. In addition, the NVMDs may include emerging types of memory, such as phase change memory.

On these NVMDs, the latency of each I/O operation may depend on the density or the processing technology of the non-volatile memory devices as well as the presence of a weakness (or degradation) in a particular region, as illustrated below.

On these NVMDs, flash memory stores data in individual memory cells using floating-gate transistors. Various memory cell technologies have been developed, including, for example, single-level cell (SLC) and multi-level cell (MLC). A SLC may have two possible states and thus encode one bit of data. A "0" or "1" is determined by the threshold voltage Vt of the flash cell. The threshold voltage can be manipulated by the amount of charge put on the floating gate of the flash cell. A flash memory chip based on SLC memory cells may be referred to as a SLC flash memory. In comparison, an MLC may allow more bits to be stored using the same number of transistors per cell. A flash memory chip based on MLC memory cells may be known as MLC flash memory. Some MLC cells may encode two bits of information, namely "11", "10". "01" and "00". The encoding is determined by a finer division the threshold voltage Vt of a particular flash cell, which in turn is manipulated by the amount of charge put on the floating gate of the particular flash cell. Noteworthy is that some flash cells may encode more than 2 bits of information. In fact, some flash cell may encode, for example, 3 bits of information, by an even finer division of the threshold voltage range. This increased number of states reduces the amount of margin in threshold voltage that separates the encoded states. The reduced margin results in an increased occurrence of more errors in I/O operations such as read and write on MLC flash memory than on SLC flash memory of comparable sizes. MLC flash memory designed for relatively low I/O error rates are sometimes called enterprise MLC (eMLC) flash memory.

The read speeds between SLC and MLC may be comparable. Reading the charge level of the flash cell compares the threshold voltage using a voltage comparator. Thus, the architecture difference between SLC and MLC does not affect sensing. In general, the read speeds of flash are determined by which controller is used.

SLC flash memory may have the advantage of faster write speeds, lower power consumption and higher cell endurance. Due to faster transfer speeds and longer life, SLC flash technology is used in high-performance memory cards. However, because the SLC flash memory stores less data per cell, it costs more per megabyte of storage to manufacture.

In comparison, the main benefit of MLC flash memory may include its lower cost per unit of storage due to the higher data density. However, MLC flash memory may be more prone to I/O errors than SLC flash memory of comparable size. More sophisticated error detection and correction algorithms may be relied on to handle these I/O errors. Other drawbacks of MLC flash memory may include lower write and erase speeds, lower number of program-erase cycles and higher power consumption compared to SLC flash memory of comparable size.

Thus, SLC flash memory tends to provide faster memory access than MLC flash memory of a comparable size. However, SLC devices generally provide smaller capacity per unit cost than a comparable MLC device. A MLC device may experience noisier I/O characteristics relative a SLC in terms of increased likelihood of I/O errors.

Once a particular type of NVMD has been configured as a storage-class device, the performances of these non-volatile memory devices may be operation-specific. As used herein for this application, these non-volatile memory devices adapted for storage-class applications may be referred to as non-volatile random access memories (NVRAMs) to differentiate from dynamic random-access memory (DRAM) and hard disk devices (HDD) that do not provide random access to memory, only serialized storage in cylinders, headers, and sections accessible through mechanical rotating and scanning arm(s). In this context, NVRAM and NVMD may be used interchangeably in this application.

The NVRAM device may perform certain classes of memory operations (e.g., read operations) much faster (e.g., more than one hundred times faster than hard disk devices having rotating disks and an array of mechanical arms to access a particular cylinder, header, or segment of the rotating disks). Nonetheless, the non-volatile memory devices may have physical limitations that result in other memory operations that are not only slower than operations associated with dynamic random access memory (DRAM), but also slower than other NVRAM operations. For example, write and erase operations of a NVRAM device may be much slower than read operations on the NVRAM devices. This asymmetry in I/O access time is known as an asymmetry characteristic of the NVRAM devices. Furthermore, the I/O operations may have different minimal data sizes. For example, erase operations may be performed per erase block, write operations may be performed per write page, and read operations may be performed per read page. One erase block may be the size of several write pages. One write page may be the size of several read pages.

In addition, the NVRAM may have certain "wear" characteristics that result in degraded performance over time, particularly as more write and erase operations are performed. In simple terms, weaker (or degraded) regions of the NVRAM device may develop (or increase) over time. The weaker (or degraded) regions of the NVRAM device may have I/O performances worse than other areas of flash memory on the NVRAM device. For example, weaker regions of the NVRAM device may exhibit slower read, write, or erase speed, higher error rate, etc. The weaker regions of the NVRAM device may have I/O performances worse than certain preferred values, which may be proprietary numbers heuristically set by the manufacturer, or standard numbers set forth in industry-wide guidelines. For example, weaker regions of the NVRAM device may have flash memory media with read, write, or erase speed lower than the recommended values, or be more prone to encounter errors during read, write, or erase operations. Each NVRAM device may have an expected durability as weaker regions develop or increase in size. Further, each NVRAM device may have inherent manufacturing imperfections, manifested by weaker regions, when shipped to downstream integrators or customers. In the presence of weaker regions of the flash media, data integrity as well as data access speeds need to be maintained. At the same time, I/O operations may be performed at various granularities, depending, in part, on the underlying flash media type. For NAND type memory media, read and write operations may be performed at a granularity of, for example, pages (also known as blocks) of, for example, 2 k to 16 k bytes at a time. For NOR type memory media, the read and write operations may be performed at the granularity of each byte. The apparent performance of reading/writing a particular data size on a flash media depends on the granularity of the I/O operation to execute the read/write operation, and hence depends on the processing technology of the underlying flash memory media.

Multiple NVRAM devices may be included in an NVRAM-based storage subsystem. The NVRAM-based storage subsystem may employ multiple levels of controllers to coordinate operations among each individual NVRAM device. Such NVRAM-based storage subsystems may be deployed, for example, in enterprise storage applications. In these NVRAM-based storage subsystems the controllers may be organized into a hierarchy including: slave controllers, which coordinate operations on a subset of NVRAM devices, and master controllers, which coordinate multiple slave controllers. The slave controllers may be in communication with the master controller. The slave controllers and master controllers may be configured to monitor I/O access pattern. Acting in concert with driver, slave controllers and master controllers may intelligently schedule and carry out I/O operations on individual NVRAM devices on the NVRAM-based storage subsystem.

In some implementations, a slave controller may be configured to control data transfer by coordinating and monitoring flash media access pattern of the NVRAM device that houses the slave controller. The monitored flash memory access pattern may be stored in the memory of the slave controller. The memory of the slave controller may include a portion of a flash memory media of the NVRAM device. The memory of the slave controller may also include a portion of DRAM on the slave controller. The slave controller may report the monitored access pattern to a master controller in the NVRAM-based storage system. The reported access pattern from various slave controllers on respective NVRAM devices may allow the master controller to obtain up-to-date information on the flash media access pattern across all constituent NVRAM devices of the NVRAM-based storage subsystem. Based on the up-to-date information of the constituent NVRAM devices, the NVRAM-based storage subsystem may improve its overall I/O performance by, for example, wear leveling, loading balancing, etc. The update-to-date information obtained from the constituent NVRAM devices may also provide guidance for improving the manufacturing process of the NVRAM devices, as will be discussed in detail later in this application.

For context, the driver may cooperate with master and slave controllers to intelligently carry out I/O operations in the NVRAM-based storage subsystem. The I/O operations may be requested by applications and/or the operating system, such as for example, the filesystem modules of a modularized operating system or the filesystem functionalities of a monolithic operating system. Each I/O operation is broken up into elemental flash device operations, such as, for example, a read, a write, or an erase. In carrying out the I/O operations on an individual NVRAM device in the NVRAM-based storage subsystem, the driver and controllers manage the mapping of logical blocks into physical flash locations.

The I/O performance of the NVRAM-based storage subsystem as well as its endurance may be influenced by the policy choices for block allocations for I/O operations and garbage collection, etc. Flash management includes decisions on physical block allocation, wear leveling, and garbage collection to reclaim invalid physical flash locations. These decisions manifest policy choices and can have profound effects on I/O performance, including, for example, write operations, on the NVRAM-based storage subsystem. For context, write operations can be performed synchronously on an NVRAM device on the NVRAM-based storage subsystem (i.e., involving waiting for the NVRAM device to provide a service guarantee that the write has happened), or asynchronously (by absorbing the data in some memory resources on one or more of the controllers in the NVRAM-based storage subsystem, and then relying upon power-safety mechanism on the NVRAM-based storage subsystem to provide a service guarantee of the durability of the data contents of the write).

To improve I/O performance on a particular NVRAM device, in-bound write requests received by the NVRAM-based storage subsystem may be classified. In some implementations, the in-bound write requests may be classified into different subgroups, each with similar expectancy of validity. Data contents of write requests from one particular subgroup may be written to neighboring target locations of the flash media of the NVRAM device. Because the write requests within each subgroup have data contents that are expected to become invalid at comparable time down the road, a subsequent garbage collection may recover an erase block while encountering substantially reduced relocation (for transferring valid data elsewhere on the flash media). Other considerations may also be factored in. In other implementations, the in-bound write requests may be grouped into latency-sensitive write requests and throughput-sensitive write requests. Latency-sensitive write requests may be served with asynchronous write operations while throughput-sensitive write requests may be served with synchronous write operations. In still other implementations, in-bound write requests may be scheduled according to a load condition of the target NVRAM device on the NVRAM-based storage subsystem. The load condition may be monitored. If the monitored load condition indicates a busy condition on the NVRAM device, the in-bound write requests may be served with synchronous write operations. Otherwise, the in-bound write requests may be served with asynchronous write operations.

FIG. 1A is a diagram illustrating a host computing device 100 with a NVRAM in accordance with some implementations. On the host computing device 100, user applications 110A to 110N are running at the application level 101. Each running user application may correspond to a process with segments that may include, for example, text 111, data 112, and stack 113. The segments may further include a heap. The Operating System 102 provides an Application Program Interface (API) 122 for the user applications 110A to 110N to access underlying services. In some implementations, device driver 125 may be part of OS 102 to allow high-level user applications 110A to 110N access to hardware devices on host computing device 100. The high level user applications also may be configured to access device level instrumentation and device controls. Device driver may also be part of the OS 102 in other implementations.

Host computing device 100 includes a hardware layer that includes a central processing unit (CPU) 131, main memory 132 that is typically a volatile memory, and non-volatile random-access memory (NVRAM) 133 with a controller 135. The flash memory media may be located on several cards. The cards may be peripheral component interconnect (PCI) cards to be installed on the motherboard of the host computing device using the peripheral component interconnect express (PCIe) edge connector. The motherboard of the host computing device houses CPU 131 and main memory 132 such as dynamic random access memory (DRAM). Host computing device also may include a hard disk device with mechanical arms that may utilize, for example, NVRAM 131 as an adjunct.

Each PCI card may have two types of controllers for performing logical operations, namely, a master controller, which handles host-level interactions; and slave controller (s), which handles flash-level interactions. In some implementations, one physical device on a PCI card may include one master controller, and up to, for example, eight additional physical devices, each implementing two slave controllers. The additional physical devices also may be implemented on daughter boards inserted on a baseboard, a PCI card housing the physical device implementing the master controller. Other implementations may utilize two physical devices—each of which implements one master controller and up to, for example, six slave controllers. One of the master controllers is on the "baseboard" on the PCI expansion slot on the mother board of the computing device, and the other master controller is on the "daughter board" located on an expansion slot on the baseboard. Communication between the host and the daughter board's master controller is routed through the baseboard's master controller.

The master controller and the slave controller(s) may communicate using a proprietary hardware interface. In some implementations, this interface is implemented using pins on the physical devices and traces on the baseboard. In other implementations in which master controller and slave controller(s) are in the same physical device, the interface may be implemented using internal device logic on the physical device.

In the implementations utilizing two physical devices—each of which implements one master controller, communication between the two master controllers may be through the standard interface of PCIe. A proprietary hardware interface also may be feasible.

Acting in concert, the master controller(s) and slave controller(s) may implement the data path of the system. In other words, the master controller(s) and slave controller(s) receive commands to perform flash level operations and carry these out against host DRAM resources. The data path aspect refers to the point that the controllers themselves do not determine which flash locations and which DRAM locations are involved in the above operations—this determination is made by the control path of the system. In this context, the data path may also be known as the "data plane," as commonly used in network communications.

The control path of the system is implemented by the driver software, which may be implemented as firmware instructions executed by embedded processors associated with the controllers. There may be only one "driver", per card. The driver software instructions allow each slave controller to communicate independently with the one or more master controllers. In this context, the control path may also be known as the control plane, as commonly used in network communications.

In some implementations, the data path communication may involve the direct memory access (DMA) transfer of data. For example, the driver software may generate DMA instructions including target memory addresses and initiate memory read or write cycles. The DMA instructions may utilize several registers on the master controller(s) or slave controller(s) that can be written and read by the CPU of the mother board or the embedded processors on the master controller(s). These registers may include a memory address register, a byte count register, and one or more control registers. The control registers specify the I/O port to use, the direction of the transfer (reading from the I/O device or writing to the I/O device), the transfer unit (byte at a time or word at a time), and the number of bytes to transfer in one burst.

To carry out an input, output or memory-to-memory operation, a DMA instruction may be issued from CPU to master controller(s) and then to the slave controllers on the corresponding NVRAM card to initiate transfer of data. The DMA instruction contains a count of the number of words to transfer, and the memory address whose contents are to be transferred. The master controller(s) then obtains access to the system main memory 132 for data transfer. Each time a word of data is ready to be transferred between the NVRAM card and the system main memory 132, the controller (master or slave) may increment its internal address register until the full block of data is transferred. The master and slave controller are capable of executing DMA transfers either occurring one word at a time or all at once in burst mode.

In some implementations, the driver software runs on the host computing device as device driver 125. It communicates with the master controller(s) on the card using standard PCIe commands—in standard terminology, the latter are referred to as "memory mapped I/O" (MMIO) instructions (they are load/store instructions at the CPU level, except that they get routed to the appropriate device instead of DRAM). The MMIO instructions may be used to initiate the DMA operations, as discussed above. The driver in turn receives requests from host CPU applications and operating system (e.g., the file system component), using standard host-based APIs and mechanisms (e.g., a system call).

In other implementations, the driver software runs on an embedded CPU coupled with the baseboard master controller. In these implementations, the term "firmware" is usually used to denote the driver software. In still other implementations, the driver functionality may run in a split/parallel fashion across more than one embedded CPU associated with one or more master controllers. In cases where the firmware runs on one or more embedded CPUs, the applications/operating system requests get communicated to the firmware using the same PCIe MMIO instructions, using an intermediate (separate, minimal) software driver, for example, installed on the host computing device.

Figure 1B:
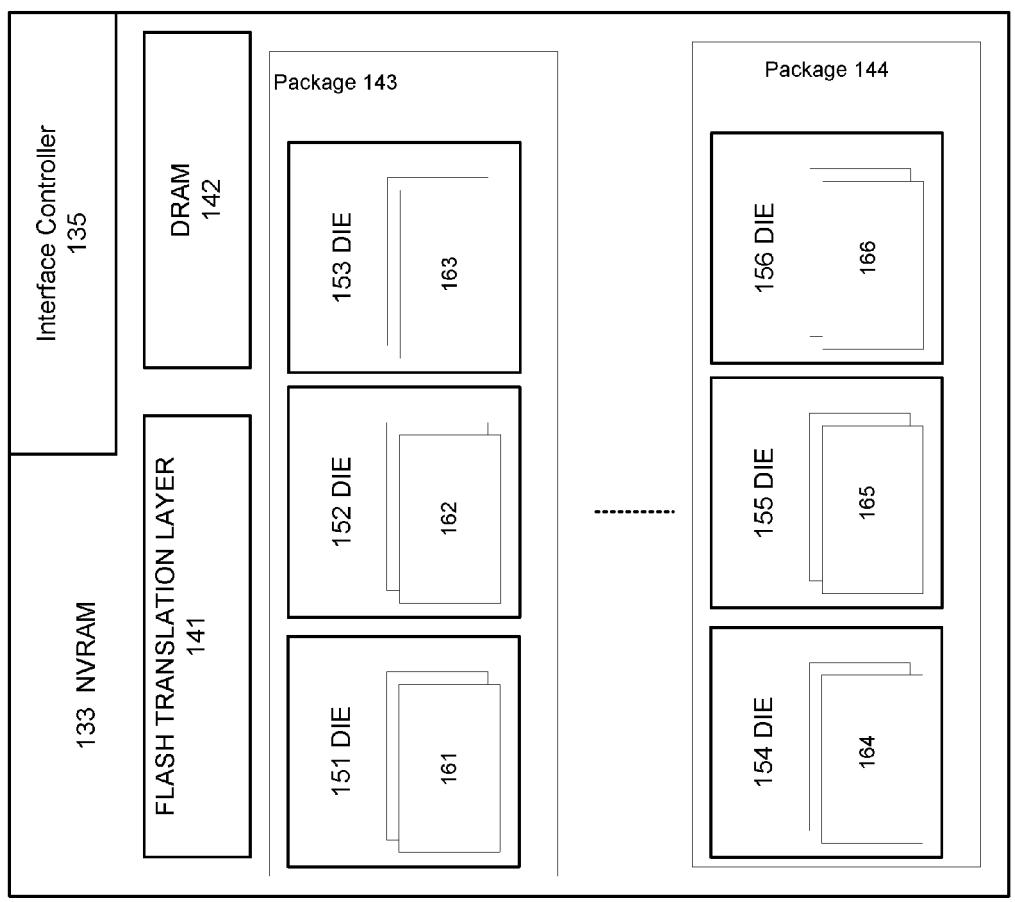
FIG. 1B is a diagram showing an example NVRAM according to some implementations.

FIG. 1B is a diagram showing an example NVRAM device according to some implementations. NVRAM 133 includes a controller 135 to interface with host computing device 100 and other NVRAM devices on NVRAM 133, as will be discussed in association with FIG. 2. NVRAM 133 may also include a flash translation layer (FTL) 141 to map an access request for data in a logic address space to the corresponding physical flash block address. In some implementations, the flash translation layer (FTL) 141 may be realized as part of device driver 125 on host computing device. FTL 141, in conjunction with device driver 125 and the operating system on the host computing device 100, may make linear flash memory appear to the system like a hard disk drive. In this role, FTL 141 may perform a number of specific functions. First, FTL 141 may create "virtual" small blocks of data, or sectors, out of flash's large erase blocks. Next, FTL 141 may manage data on the flash so that the data appears to be "write in place" when in fact the data is being stored in different locations in the flash, over time. Finally, FTL 141 may manage the flash so there are clean/erased flash locations to store data.

Specifically, a particular OS may have block device drivers that perform input and output in structured pieces called blocks. Block devices include all disk drives and other mass-storage devices on the host computing device 100. In some implementations, FTL 141 may emulate a block device. The emulated block device may render the flash media of NVRAM 133 appear, to a user on host computing device 100, as a contiguous array of storage blocks numbered from zero to one less than the total number of blocks. FTL 141 may thus server as a translation layer between the native operating system (OS) file system (FS), such as, for example, DOS BPB/FAT, WINDOWS NTFS, UNIX FS, etc., and the underlying flash media. Moreover, FTL 141 may remap the data to the physical location at which the data is to be written. This allows the native OS file system to treat flash media on a NVRAM device like any other block storage device and remain ignorant of physical characteristics of the flash media on the NVRAM device. To the user on computing device 100, FTL 141 may appear to simply take the data from the file system and write it at the specified serial location (e.g., a consecutive sector). To the underlying flash media on the NVRAM device, FTL 141 places the data at a free/erased location on the flash media and notes the physical location where the data is placed. As a result, when the file system requests for the data that has been placed on the NVRAM device, FTL 141 finds and reads back the proper data. FTL 141 may have its own cache, for example, flash memory media or DRAM, to store such information.

NVRAM 133 may include flash memory media organized in a hierarchy. First, NVRAM 133 includes a card of NVMD. The card can be a PCIe card utilizing the PCI interface and located on a PCI expansion slot of the motherboard of host computing device 100. Such a card may also be known as the baseboard. The card also can be a daughter board mounted on a base board.

Each card of NVMD includes a series of packages, for example packages 143 to 144. Each package may include a series of dice, for example, dice 151, 152, 153 on package 143, dice 154, 155 and 156 on package 144. Each die may include one contiguous semiconductor substrate on which flash media cells are fabricated. In this context, a die may be represented or referenced as a memory chip, and the terms "die" and "chip" are used interchangeably. Each flash media cell is a storage cell that includes a control gate, a floating gate, a source region, and a drain region. Depending on the configuration of the control gate and the floating gate, the flash media may be NAND type or NOR type. Depending on the processing technology of the floating gate, a given flash media cell may be an SLC cell or a MLC cell, as discussed above. The flash media cells on a particular NVRAM device may be processed using the same technology and under the same configuration.

Each die may include a multitude of flash planes, for example, plane 161, 162, 163, 164, 165, 166 respectively on dice 151, 152, 153, 154, 155, and 156. A flash "plane" is a physical sub-die structure and each die may have an even number of flash planes. For a die with two planes, it essentially has two distinct sub-regions—each with their own array of memory cells and interface circuitry. The die may include a simple demultiplexing structure, which sends out commands to one plane or the other (or in some cases, to both planes).

Each flash plane may include constituent blocks of media cells, arranged in collections referred to as erase blocks. Erase blocks may be, for example, 1 MB to 4 MB in size, and represent the smallest unit of flash memory media that can be erased using a single erase operation. Each erase block may in turn contain multiple smaller granularity of write blocks, which represent the smallest granularity of flash memory media that can be written to using a single program operation. The write blocks may be, for example, 2 KB to 16 KB in size. Each write block must first be erased before data contents can be written to the write block. Each write block of media cells may be further divided based on the smallest unit for accessing data contents stored on the flash memory media. For example, for NAND type of flash memory cells, read operations may be performed in blocks (or pages) of size 512 bytes-16 KB.

NVRAM 133 may additionally include dynamic random-access memory DRAM 142 to serve as a buffer between main memory 132 and each constituent package. Both FTL 141 and controller 135 may include additional DRAM of their own.

Figure 2:
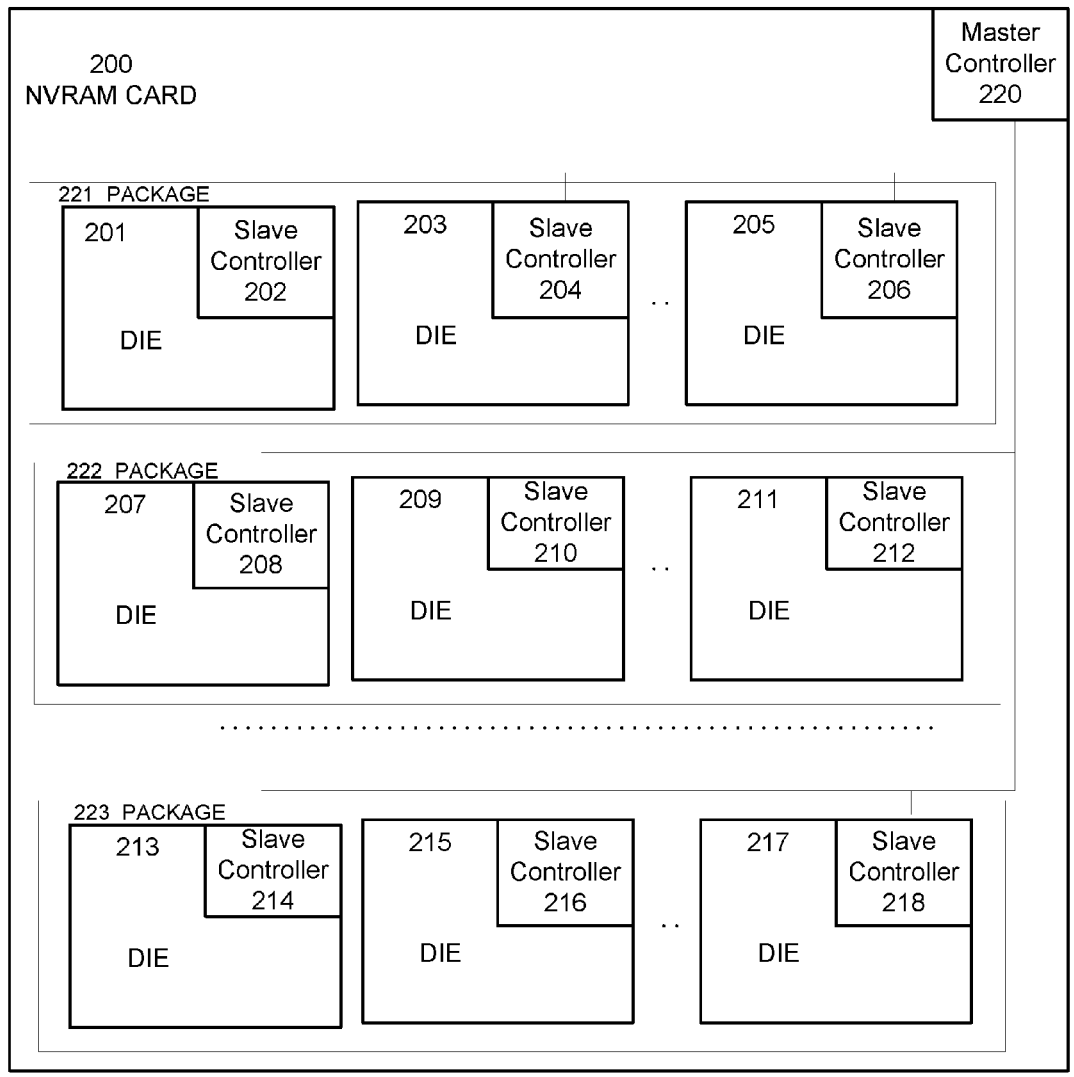
FIG. 2 is a diagram of a NVRAM device with multiple levels of controllers according to some implementations.

FIG. 2 is a diagram of a NVRAM-based storage subsystem NVRAM card 200 according to some implementations. NVRAM CARD 200 may include packages 221, 222, and 223. Package 221 may include NVRAM devices 201, 203, and 205. Package 222 may include NVRAM devices 207, 209, and 211. Package 223 may include NVRAM devices 213, 215, and 217. These packages may be configured to provide data redundancy using a redundant array of independent disks (RAID) mechanism, as outlined in co-pending patent application 61/746,679. The configured NVRAM-card 200 may store data redundantly in data stripes distributed across packages 221 to 223. In this context, packages 221 to 223 may also be referred to as RAID groups 221 to 223. The grouping can be either static, i.e., predetermined and fixed, or dynamic, i.e. adjustable due to re-striping resulting from I/O errors. Also in this context, a sub-section of a flash memory die may be a region of flash memory media within a die, such as a write page, an erase block, a sector or some suitable logical or physical portion of the flash memory die. When a subsection of flash memory die is in a weakened (or degraded) state, only the data in the degraded sub-section of the flash memory die is replaced, either from mirrored copies replicated elsewhere for reliability, or reconstructed from a parity-based encoding of the data spread across multiple dice. Subsequently, the flash memory die is dynamically re-striped into different planes (or packages), taking into account the weakened (or degraded) portion of the flash memory die. Details of dynamic re-striping can be found in a companion patent application 61/746,679.

A NVRAM device may be a NVMD device on the peripheral component interface (PCI) bus of the host computing device. The NVRAM device may also be mounted on other type of buses, such as Dual In-line Memory Module (DIMM), AT Attachment (ATA), Serial ATA (SATA), SATA express (SATAe), Small Computer System Interface (SCSI), etc. A NVMD device in this configuration may be known as a baseboard. Some NVRAM devices may be implemented as daughter boards mounted on a baseboard.

Each NVRAM device on a package (or a RAID group) may have a slave controller that controls the read, write, and erase memory operations on the NVRAM device. The slave controllers 202, 204, 206, 208, 210, 212, 214, 216, 218 on the respective NVRAM devices may be connected to the master controller 220 by a plurality of master-slave memory bus channels, which may be implemented as PCB traces on the baseboard of NVRAM card 200. Each slave controller may be mounted on the package or on the baseboard. Each slave controller may be configured for providing transparent access to the hosting NVRAM device. Each slave controller may include microinstructions tuned for memory operations on flash planes of each NVRAM device. Each slave controller may also include an embedded processor having firmware instructions for performing the same memory access functions.

As illustrated by FIG. 2, NVRAM card 200 may include a master controller 220 in communication with each slave controller on the constituent NVRAM devices of the packages 221, 222, and 223. Master controller 220 may have an embedded processor to execute firmware instructions for read, write, erase, and maintenance operations in coordination with the slave controllers on the slave NVRAM devices of each RAID package. Master controller 220 natively controls the flash memory dice to obtain predictable bandwidth and latency performance with the flash memory dice included in the packages 221-223. All operations that take place on the flash memory dice 201, 203, 205, 207, 209, 211, 213, 215, and 217 (for example, read, write, erase, control operations such as reset, etc.) are completely visible to (and under the control of) the master controller 220. The flash memory interface of a given flash die in a particular package is passed through the respective slave memory controller to the master controller 206. For example, the flash memory interface of the die 201 is passed through the slave controller 202 to the master controller 220.

In this context, device driver 125 on host computing device, along with master controller 220 and each slave controller, may be configured to perform a plethora of operations to improve I/O operation performance on a NVRAM-based storage subsystem. The operations may include, for example, error correction, wear leveling, bad block mapping, read scrubbing or read disturb management, write disturb management, read and write caching, garbage collection, and encryption, etc.

Specifically, the master controller(s) and slave controllers of NVRAM card 200 implements the data path of the system in which data is transported between main memory 132 and the flash memory media of each NVRAM device of the RAID device. The data path of the flash operations may include, for example, data transfers, operation scheduling, etc. In this context, the data path may also be known as the "data plane."

In comparison, the control path determines, for example, the I/O location of I/O operations and the block size of the I/O operations. As discussed above, the control path of flash management activities is implemented by the driver software, which may be implemented as firmware instructions executed by CPU 131 on host computing device 100, or by embedded processor(s) on master controller 220. In this context, the control path may also be known as the control plane.

Error correction may include both detection and correction of flash media errors. Error detection identifies inconsistencies in memory access operations. Error detection may use techniques such as repetition codes, parity bits, checksums, cyclic redundancy checks (CRCs), as well as other cryptographic hash functions. Error correction attempts to cure the identified inconsistencies. Error correction may utilize a variety of techniques such as automatic repeat request, error-correcting code (ECC), etc. Example ECC algorithms may include Reed-Solomon algorithm, Hamming algorithm, and Bose Ray-Chaudhuri Hocquenghem (BCH) algorithm, etc.

A NVRAM device includes flash blocks, each of which can be put through a limited number of erase cycles before exhibiting unreliable behavior. For example, a MLC NAND flash block may withstand 3000-10000 cycles of erase operations before accesses to it return more errors than can be corrected with reasonable implementation complexity. To cope with problems associated with device wear, wear leveling techniques attempt to spread out write operations evenly across all flash segments.

Wear leveling techniques may be dynamic in which the FTL 141 uses a map to link Logical Block Addresses (LBAs) of the file system to the physical flash media in a memory hierarchy as discussed above. Each time the application or an OS component, for example the file system, writes replacement data, the map is updated so that the original physical block is marked as holding invalid data, and a new block is linked to that map entry. Each time a block of data is re-written to the flash memory, it is written to a new physical location on the flash media and the map is updated accordingly to reflect the re-write. However, blocks that never get replacement data sit with no additional wear on the flash memory. The device may be configured so that only dynamic data is recycled. Under the dynamic approach, the NVRAM device may last longer than one with no wear leveling, but there are blocks still remaining as active that will go unused when the drive is no longer operable. Wear leveling techniques also may be static in which the static blocks that do not change are periodically moved so that these low usage cells are able to be used by other data. Wear leveling techniques may additionally include setting aside the static blocks that do not change until other blocks are as worn as the static blocks. The rotational effect associated with the static approach may enable the NVRAM to operate until most of the blocks are near their end of life.

Flash memory blocks have to be explicitly erased before they can be written to. The time taken to erase blocks can be significant. To reduce latency of write, when the information stored at a flash block is to be updated, the controller may be programmed to write a new copy of the changed data over to a fresh block, remap the memory pointers, and then erase the old block later, as a background operation, when there are fewer memory access requests pending.

Together with device driver 125, the master controller 220 and slave controllers may perform read scrubbing or read disturb management. Read scrubbing refers to the process of detecting and correcting bit errors during a read operation and using error detecting codes, such as ECC code, to correct the bit error. A read disturb refers to an I/O error when one or more bits are changed during a read operation. Read disturb errors occur within the block being read, but on a page or pages other than the page being read. Performing a large number (e.g., hundreds of thousands or millions) of read operations on individual pages before an erase command for the block that includes those pages can exacerbate this error. To recover from this type of error, master controller 220 and slave controllers may be programmed to erase the block where the error occurred and rewrite the data to that block.

Together with device driver 125, the master controller 220 and slave controllers may additionally perform "write disturb" management—where a write to a flash cell disturbs the data in another neighboring region in the same write page. In some implementations, write disturb management handling is accomplished by controlling the order in which flash cells are written. In some other implementations, write disturb management handling is accomplished by limiting the subset of cells that receive writes as the device approaches end of life (at the expense of reducing device spare capacity).

Together with device driver 125, the master controller 220 and slave controllers may additionally perform read and write caching. A NVRAM device 133 may include on-chip DRAM 142. Using on-chip DRAMs as a buffer, master controller 220, in combination with slave controllers, may cache information for a read or write operation in accordance with the respective predicted data access patterns. Caching may generally boost the apparently I/O performance as measured in, for example, throughput, apparent access time, etc.

Together with device driver 125, the master controller 220 and slave controllers may additionally perform garbage collection. After every block of a NVRAM device has been written once, the flash controller will need to return to some of the initial blocks which no longer have current data (also called stale blocks). These stale blocks may correspond to data no longer being used by an application program. The data in these blocks may have been replaced with newly written blocks and now they are waiting to be erased so that new data can be written into them. This is a process called garbage collection (GC). As discussed above, GC may be a background task for the master controller 220 and slave controllers in the sense that GC may be performed when there are few pending I/O requests.

Together with device driver 125, the master controller 220 and slave controllers may additionally perform encryption by using a variety of encryption algorithms, including, but not limited to, symmetric encryption and asymmetric encryption. Symmetric encryption may employ, for example, any block cipher algorithm in existence or being developed. Example block algorithms may include, data encryption standard (DES), advanced encryption standard (AES), blowfish, International Data Encryption Algorithm (IDEA), RC5, etc.

Master controller 220 and slave controllers may be further configured for monitoring I/O performance metrics of a NVRAM device and mapping bad blocks. I/O performance monitoring and mapping may be accomplished by a combination of hardware and software solutions. The hardware components of an example NVRAM device have been described above. The software configurations may include implementations through device driver 125 and API 122, as shown in FIG. 1. API 122 may provide an interface for user applications to access NVRAM devices through device drivers 125. A user application may trigger I/O requests to access the NVRAM devices. For example, a user application may attempt to open a file and read the contents of the file, or the user application may query a database for entries matching search criterion.

The I/O requests may be initially sent from the device driver 125 to the master controller 220 on host computing device 100. The master controller 220 may then coordinate the distribution of the I/O requests to the slave controllers on the NVRAM device holding informational content to which the I/O requests are addressed. The I/O requests may then be pushed to the slave controllers in a non-blocking manner in which the master controller 220 does not stay idle to wait for the responses from the slave controllers. Instead, the master controller 220 may continue with other scheduled tasks. When the response from the slave controllers arrives, follow-up actions may be invoked at the master controller 220 as well as the device driver 125 to coalesce the responses and relay the information back to the user application that triggered the I/O requests. As discussed above, the non-blocking and blocking data transfers may be implemented as DMA data transfers.

Figure 3:
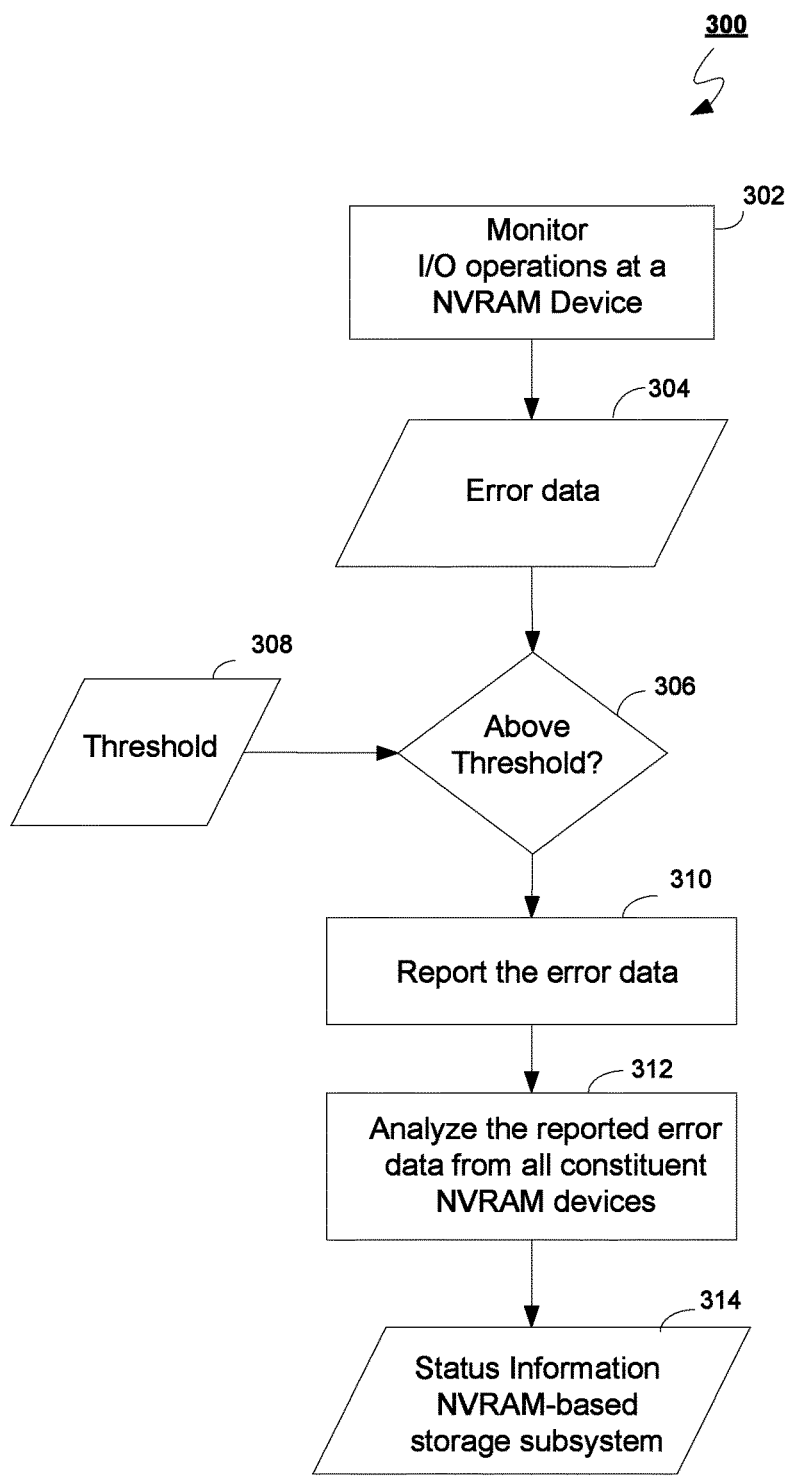
FIG. 3 is a flow chart of monitoring metrics and reporting I/O errors according to some implementations.

FIG. 3 shows flow chart 300 for monitoring metrics and reporting I/O errors according to some implementations. A combination of hardware and software solutions, as discussed above, may act in concert to monitor a performance metric of I/O operation at each NVRAM device of a NVRAM-based storage subsystem (302). The performance metric may pertain to the duration of an I/O operation, such as, a read, a write, or an erase. In some implementations, the duration time of an I/O operation being monitored may include the program time for writing and reading from a buffer. The performance metric being monitored may also include number of correctable errors or error rate for the I/O operations. The correctable errors may be identified by an error checking mechanism, such as, for example, a check sum, a cyclic redundancy coding (CRC) or an error-correcting code (ECC). A correctable error, once detected, may be corrected by, for example, an ECC coding mechanism. A related performance metric may be the bit error rate that represents failing bits corrected with appropriate levels of ECC. A raw bit error rate (RBER) may represent bit error rate prior to ECC. Since the correctable bit errors do not result in data loss, an uncorrectable bit error rate (UBER) may indicate the amount of data loss under a given ECC implementation. Typically, the performance of a given ECC coding scheme correlates with the amount of spare space allocated to each read/write page (block). Often times, an NVRAM device may need more spare space of ECC to achieve a lower UBER, for example, under $10^{17}$. In some implementations, the spare space may allow correction of up to 80 bits per 1 kB of data for a 20 nm class NAND flash device. In some implementations, error rate or correctable error may be monitored on a per operation basis at the level of each bit/bite being accessed at run-time. In other implementations, the error rate or correctable error may be monitored on a summary basis, for example, an aggregate of many operations or an aggregate of bits/bytes being accessed at run-time. Master controller 220 and slave controllers on each NVRAM device may perform the tracking and monitoring operations.

Master controller 220 may coordinate slave controllers 202 to 218 to monitor an I/O operation on the respective hosting NVRAM device. For example, when measuring the speed of an I/O request, master controller 220 may send the I/O request for data contents at a particular memory location to a slave controller in charge of that particular memory location. In some implementations, the request may be sent at time 1 with a time stamp on the master controller. The slave controller in charge of that particular memory location may return the data contents at the requested memory location. When the master controller receives the data contents at time 2, it may generate a new time stamp. The difference between the two time stamps indicates the duration for the read/write operation at the particular memory location. In these implementations, the time stamps may be issued according to a local clock on master clock 220. In other implementations, the slave controller, upon receiving the I/O request, may timestamp the receipt time. Upon completion of the requested I/O operation and before the result is returned to master controller 220, the slave controller may timestamp the competition time. The difference between the completion time and the receipt time may be reported by the slave controller back to the master controller 220 as the duration for the I/O operation at the particular memory location. In these implementations, the timestamps may be issued according to a local clock on the slave controller. In still other implementations, if the I/O operation is implemented as a blocking operation in which the issuing process or thread waits for the I/O operation to finish, the application process or thread may simply measure the time elapsed between when the I/O request is issued and the result is returned. In these implementations, the time may be measured according to a system clock on motherboard of host computing device 100.

For example, when measuring an error rate of an I/O request, master controller 220 may send the I/O request for data contents at a particular memory location to a slave controller in charge of that particular memory location. The slave controller in charge of that particular memory location may execute the I/O request to, for example, retrieve a 4 k page of data contents in response to a read request. The data contents are obtained with parity checking codes for verification of data integrity. In some implementations, the slave controller may perform parity checking of the obtained data contents and then compare the checking result with the parity checking codes. Based on the comparison, the slave controller may correct errors in the data contents received, if correctable. Thereafter, slave controller may report the error, or correctable error, to the master controller. The reporting may be delayed, to consolidate a threshold number of errors or correctable errors in one report. The threshold number may be a proprietary number determined heuristically. The threshold number also may be a standard number agreed upon by chip makers and original equipment manufacturers (OEM). The reporting may be triggered by, for example, a counter on the slave controller indicating a threshold number or errors or correctable errors have occurred. The reporting may be triggered by an instruction from master controller 220 in the control path to request reporting from slave controller. The reporting also may be periodic when a pre-determined period of time has elapsed.

In other implementations, slave controller may refrain from error checking or correction for read operations. Instead, master controller 220 conducts error checking and correction upon receipt of the requested data contents. Thereafter, master controller may coalesce the identified errors or correctable errors before reporting to host computing device. The coalescing may consolidate a threshold number of errors or correctable errors in one report. The threshold number may be a proprietary number determined heuristically. The threshold number also may be a standard number agreed upon by chip makers and original equipment manufacturers (OEM). Reporting to host computing device 100 may be triggered by, for example, a counter on master controller 220 indicating a threshold number or errors or correctable errors have occurred. The reporting may be triggered by a request from device driver 125 on host computing device for information on error counts or error rate. Reporting to host computing device 100 may be periodic, e.g., whenever a pre-determined period of time has elapsed.

The granularity of the I/O operation being tracked for monitoring a performance metric may vary across implementations. Some implementations may track the I/O operations at the granularity of an individual write page. Example write pages may range in size from, for example, 2 kB to 16 kB. Some implementations may track the performance for each erase block which may include multiple write pages. Others implementations may track the I/O operations at coarser granularities, such as, for example, at the granularity of each die plane (which includes multiple erase blocks), at the granularity of each flash die (which includes multiple die planes), at the granularity of each package (which includes multiple flash dices), or at the granularity of each card (which includes multiple packages).

The granularity of tracking and monitoring may be a function of the age of the NVRAM devices of the NVRAM-based storage subsystem. Earlier on in their expected life time, the granularity can be coarser as the I/O operations are expected to run smoothly then. Later on in the life time of the NVRAM device, the granularity may be finer due to an increased likelihood of errors and degradation in the I/O operations. The granularity of tracking and monitoring may hinge on the specific application utilizing the NVRAM-based storage subsystem. For applications in which data integrity and reliability may be a paramount concern, such as remote and distributed database applications demanding atomic operations for data coherence across distributed data storage locations, the granularity of tracking and monitoring may be finer. For applications in which data throughput may be favored over data integrity, such as, for example, routine data back-up for an e-commerce data server, the granularity may be coarser.

The frequency of monitoring the I/O operations may also vary across implementations. The monitoring frequency can be configured for each NVRAM device according to a user preference. For example, for routine data back-up on a campus network, the user may prefer less frequent and more sporadic tracking and monitoring of I/O operations. For example, for banking applications or high-frequency trading applications, the user may prefer more frequent and less sporadic tracking and monitoring of I/O operations.

In some implementations, the request for tracked information may be issued by an application program and then queued at master controller 220. For example, master controller 220 may receive 4 kB-sized I/O requests and may distribute them to four (4) slave controllers, each receiving 1 kB-sized I/O requests. Each slave controller may send request completion packet to master controller 220 to signal that the requested information is available. The slave controllers may execute the received requests and respond with the completion packet out of the order in which the requests were received, given the different load conditions on each slave controller. The completion packet arriving at the master controller 220 may trigger a follow-on action at the master controller 220. In response, the master controller may match a given completion packet to a particular request that was sent to the slave controller. Master controller 220 may further rearrange/reorder the completion packets from the slave controllers to which the requests were sent. Once all completion packets have been received, master controller 220 may coalesce the completion packets and reply to the requesting application with the requested information. In other implementations, the slave controllers may sua sponte track the performance metric of I/O operations on the NVRAM device and then periodically send the tracked performance metrics to master controller 220. Depending on the overall load conditions of the controllers on the NVRAM device, the slave controllers can be configured to track the I/O operations sua sponte, or at the request from master controller 220.

The tracked I/O operations may generate error data 304. In this context, error data may generally refer to metrics tending to show I/O errors, error rates, correctable errors, as well as I/O operation durations. Error data 304 may be compared (306) with a threshold setting, the crossing of which may cause an error report to be generated at slave controllers and then propagated to master controller 220. The threshold 308 may be a cut-off bar. For example, the threshold 308 may be a duration threshold associated with a memory operation, such as a read, write, or erase. The duration threshold may be the upper limit for the memory operation, the surpassing of which triggers an error report. The duration threshold may also be a time-out value, beyond which the memory operation will be aborted. The threshold 308 may also be a floor level of the number of read, write, or erase, per unit time. This floor level may detect NVRAM devices with an abundance of defective flash pages. For erase operations, the threshold 308 also may be a floor level. Because of flash memory media geometry, I/O operations such as erase may end up becoming faster in the weakened or degraded region. If the duration for erase operation falls under the floor level, an error report may be generated. The threshold 308 may also be a threshold ratio of cells that hold data inconsistent with what was stored. Once the monitored ratio reaches the threshold ratio, an error report may be triggered. The threshold 308 also may be a threshold number of the occurrences of correctable errors as witnessed by master control 220. If the number of correctable errors seen by the master controller 220 exceeds the threshold value, an error report may be generated.

The threshold 308 may be adapted and adjusted on the fly at run time and during field operations. In addition, the threshold 308 may be stricter during the early life-time of a NVRAM device and may be relaxed towards the later stages of the life-time of the NVRAM device. As discussed above, during earlier stage of the life-time of the NVRAM device, fewer wear-induced anomalies are expected while in later stages of the life-time of the NVRAM device, more anomalies are expected due to wear and use over time. An adjustable threshold may strike a balance in the trade-off between the number of alerts generated (which may slow down regular performance) and the amount of information obtained from monitoring.

In some implementations, the threshold 308 may be dynamically configured according to any machine learning scheme or generic algorithms that can improve on its own. The machine learning scheme or generic algorithm can learn from past patterns of I/O performance metrics to infer an optimal threshold value to best differentiate a normal region from a weakened or degraded region. Thus, adjustments of the threshold value may be made accordingly based on the inference. In other implementations, the thresholds may be programmed beforehand in a pre-determined manner. The pre-determined threshold value may be based on a statistical analysis, such as, for example, a student t-test, an ANOVA analysis, etc. The statistical analysis may consider the correlation of historical I/O performance metric and actual device status to derive the threshold value that optimally differentiates a normal group and a weakened/degraded group. The optimality of the differentiation may be based on the highest confidence level statically, the lowest p-value, etc.

In still other implementations, the threshold 308 may be adjusted retroactively based on a statistical analysis of current error reports from monitoring a given performance metric. In these implementations, a history of recorded performance metrics may be available on the master controller 220 on host computing device 100. The history data of a given performance metric may indicate a trend towards, for example, increased latency in a memory operation. The history data may reveal both long term and short term trends. Short term trends may be based on error data measurements collected over a period of hours or days while long term trends may refer to analysis based on measurements collected over longer time periods such as weeks or months. The trend may be analyzed based on a linear prediction (LP) model. In addition, the statistical analysis may reveal outliers from a distribution of recorded performance metrics. The cut-off threshold may be expressed as a statistical bar. For example, for a performance metric based on memory access speed, the statistical bar could be at 2-sigma above the mean access speed. For a normal distribution, a statistic bar at 2-sigma singles out approximately 5% of samples as outliers at the margins.

Table 1 below summarizes example threshold values of I/O performance metrics to trigger an error report in some implementations.

TABLE 1

Example threshold values of I/O metrics to trigger error report

| PE cycle range | Min Correctable Error Threshold (per 512B) | Max Correctable Error Threshold (per 512B) | # of 512B blocks in erase block showing correctable errors above min threshold | Write Time Threshold | Erase Time Threshold |
|---|---|---|---|---|---|
| 0-2000 | 1 | 3 | 4/2048 | 1.5 ms | 2.0 ms |
| 2000-3500 | 3 | 5 | 4/2048 | 1.5 ms | 2.0 ms |
| 3500-5000 | 5 | 10 | 8/2048 | 1.5 ms | 2.0 ms |
| 5000-7500 | 8 | 15 | 32/2048 | 2.0 ms | 3.0 ms |
| 7500-10000 | 12 | 20 | 128/2048 | 2.2 ms | 3.0 ms |
| 10000-20000 | 18 | 30 | 256/2048 | 2.5 ms | 3.0 ms |

The thresholds in Table 1 are established based on the wear level of an average flash cell, as measured by the current Program/Erase (P/E) cycle that the flash cell is on. For context, each erase operation increments the P/E cycle count for that erase block. For a flash memory cell currently at 2500 P/E cycle, which is covered by the second row in Table 1, the min and max threshold of correctable errors (per 512B) are tabulated at 3 and 5, the threshold number of 512B blocks in each erase block showing correctable error above the min threshold is tabulated at 4, the threshold write time is tabulated at 1.5 ms, and the threshold erase time is tabulated at 2.0 ms. As discussed above, these threshold values tend to become more relaxed when NVRAM-based storage subsystem becomes more aged (i.e., when the P/E cycle of the underlying flash memory cell has increased).

As discussed above, if a threshold (308) is exceeded or unmet, error report may be generated based on the error date (310). The reported error data from all constituent NVRAM devices may be analyzed (312). In some implementations, the error reports may be analyzed at various flash region granularities in association with the memory access operations being monitored. For example, the error report may be analyzed at the granularity of each write page and a write page may be 2 k-16 k bytes. The error report may also be analyzed on the basis of each erase block that includes a multitude of write pages. In this mode, each write page may not be analyzed individually but will be analyzed in the aggregate. The error report may additionally be analyzed at the plane level, with each plane including multiple erase blocks. In this mode, the erase blocks will be only be analyzed in the aggregate. The error report may further be analyzed at the die level in which the underlying planes will be analyzed in the aggregate rather than individually. The error report may further be analyzed at the granularity of each package in which the multiple underlying dice are analyzed in the aggregate. Likewise, the error report may be analyzed at the level of each card, which is the coarsest level of analysis.

The granularity of the analysis may be a function of the age of the NVRAM device. Earlier on in their expected life time, the granularity can be coarser as the I/O operations are expected to run smoothly then. Later on in the life time of the NVRAM device, the granularity may be finer due to an increased likelihood of glitches in the I/O operations. The granularity of analysis may hinge on the specific application utilizing the NVRAM device. For applications in which data integrity and reliability may be a paramount concern, such as remote and distributed database applications demanding atomic operations for data coherence across distributed data storage locations, the granularity of analysis may be finer. For applications in which data throughput may be favored over data integrity, such as, for example, routine data back-up for an e-commerce data server, the granularity may be coarser.

In some implementations, information in the error reports may be projected across various granularities. For example, if the information in an error report reveals good write pages existing within erase blocks that had experienced degraded write pages, then the good write pages may be considered as degraded write pages in an imputed manner. Similarly, if the information in an error report reveals good erase blocks in a plane level that includes bad erase blocks previously logged, then the good erase blocks may be considered as bad erase blocks in an imputed manner. Likewise, if the information in an error report reveals good die planes in a that has logged bad planes, the good planes may be considered as bad planes in an imputed manner out of an abundance of caution. Moreover, if the information in an error report reveals good dice in a package that has logged an earlier bad die, the good dice may be considered as bad dice in an imputed manner and out of an abundance of caution. Lastly, if the information in an error report reveals good packages in a card that has logged an earlier bad package, the good packages may be considered as bad packages in an imputed manner and out of an abundance of caution. The imputed approach may be favored for applications demanding high reliability data storage. Such data storage applications can be found in banking industry, electronic trading platform, defense industry (for example, controlling radar/sonar and missile launches, aerospace industry (for example, on-board control on space shuttles, satellites, and space stations), energy industry (for example, real-time control of centrifuges and reactors in a nuclear energy plant).

Status information of physical devices (314) may be generated when the error reports have been analyzed. As discussed above, the I/O access performance metrics may be collected at various times during the life cycle of a NVRAM device. When the I/O performance metrics have been measured, error reports may be triggered, which may then be analyzed (312). During earlier stages, status information of physical devices (314) may be generated less frequently when the expected anomalies are relatively rare. During later stages, status information of physical devices (314) may be generated more frequently when the expected anomalies are more likely.

Figure 4:
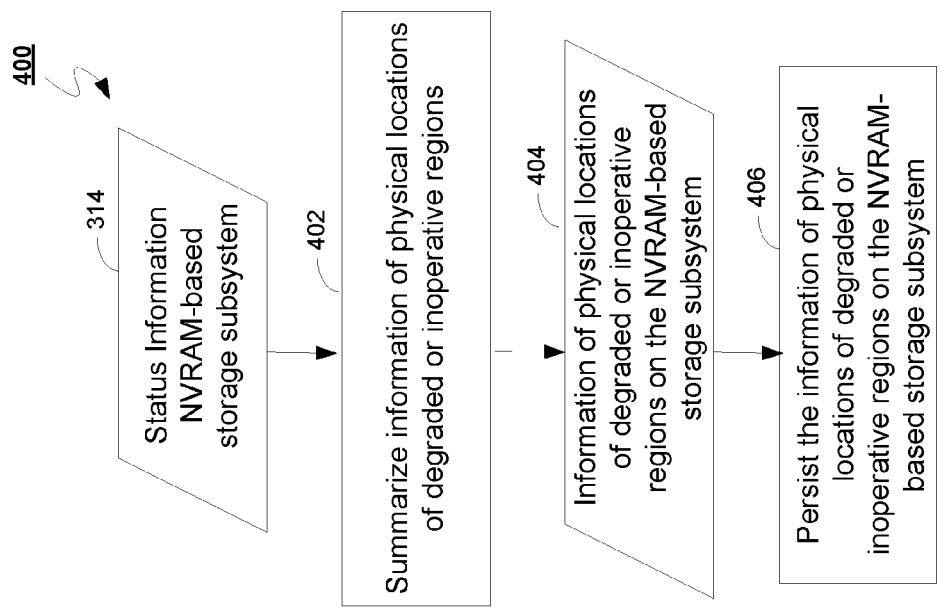
FIG. 4 is a flow chart of a method for mapping defective physical regions on an NVRAM according to some implementations.

FIG. 4 shows a flow chart of mapping defective physical regions on an NVRAM device according to some implementations. Generally, the information generated may be used to map weak regions of the NVRAM storage. In some implementations, the weak regions may correspond to weaker areas within an underlying flash memory media. Weaker or degraded areas within an underlying flash memory media generally refer to the areas that are more prone to an error report. For example, weaker or degraded areas may be more likely to receive a report of write page error than other areas of the underlying flash memory media when the threshold level for error reporting remains uniform throughout the underlying device. For example, the weaker or degraded areas within an underlying flash memory media may correspond to regions that have received disproportionately more error reports than other regions. For example, the weaker or degraded areas of the underlying flash memory media may have a more lenient threshold than other regions. In other implementations, the weak or degraded regions may also correspond to an entire flash memory media device. For example, weaker flash memory media may be more likely to receive an error of write page error than other NVMDs when the threshold levels for error reporting are identical throughout. For example, the weaker flash memory media may correspond to those NVMDs that have received disproportionately more error reports than other devices. For example, the weaker flash memory media may have a more lenient threshold level than other NVMDs. The identification of weaker areas within an underlying flash memory media or a weaker flash memory media may render the entire card in a degraded state.

When weakness or degradation of the NVRAM device has been mapped, subsequent I/O operations to the mapped weak regions may be reduced. Generally, the weaker or degraded areas are the areas that have bad I/O performance characteristics which may or may not be bad enough to cause the areas to be inoperative. The weaker or degraded areas may not correspond to just the nearest neighbors of the inoperative regions. As a general rule of thumb, however, as the NVRAM devices ages, the I/O performance metrics may be tracked more often and weaker regions are likely to deteriorate from weaker regions to inoperative regions.

Referring to Table 1, for correctable error counts, flash regions that show more than the "max correctable error threshold" may be labeled as "inoperative", flash regions exhibiting error count properties larger than "min" and less than "max" may be labeled as "degraded"—and as an example, subject to lower read disturb thresholds. For write time thresholds, a constant factor (e.g., 1.5 or similar numbers) may be used in some implementations to differentiate degraded and inoperative regions. For example, with a write duration threshold of 2.0 ms, flash regions seeing program times of less than 2 ms may be considered normal, flash regions seeing program times above 2.0 ms but less than 3.0 ms may be considered degraded, and flash regions seeing program times above 3.0 ms considered inoperative.

Once the physical locations of the weakened or degraded regions are mapped on each NVRAM device of a NVRAM-based storage subsystem, an application on host computing device needs to be made aware of these physical locations. Initially, physical locations of degraded or inoperative regions on each constituent NVRAM devices may be summarized for the NVRAM-based storage subsystem (402). For example, the storage may be on a special portion within the NVRAM, such as a Single-Level-Cell (SLC) portion to facilitate or improve I/O operation performance. As discussed above, SLC portions may provide faster memory access than MLC portions at the expense of smaller capacity per unit cost. Thereafter, the summarized information of the physical locations (404) may be persisted (406), for example, at a central server.

Based on this summarized information, FTL 141 may avoid these bad blacks when mapping physical locations on the NVRAM storage subsystem to linear block address (LBA). The LBA is the block device view presented to the operating system for mapping to a logic block in the file system, as seen by an application.

The stored information may reveal a system-level representation of the bad blocks for the entire NVRAM-based storage subsystem.

The system-level representation of bad blocks on NVRAM devices on the NVRAM-based storage subsystem may be utilized in a variety of ways for device management. The status information may be used to characterize pre-manufacturing defects as a feedback to the processor of the underlying semiconductor components on, for example, yield, defect distribution, device durability, etc. The system-level representation of bad blocks may also be used as feedback to product manufacturing. The feedback may provide information on reliability of the NVRAM devices as manufactured. The system-level representation of bad blocks may additionally guide deployment of the NVRAM devices in an enterprise computing environment as an NVRAM-based storage subsystem. The deployment may provide a central reporting capability for the slave controllers to submit error reports to a central location, for example, through master controller 220.

Based on the system-level implementation, fewer I/O operations may be scheduled in the mapped weaker or degraded areas as summarized in the system level representation. Based on the summarized representation of weaker or degraded areas, various memory access scheduling may be performed. At the page level, for example write operations in the mapped weaker or degraded areas may be disabled and only read operations may be allowed in the mapped weaker areas. For example, read operations in some weaker or degraded areas may be stopped when the correctable error associated with the weaker or degraded areas surpasses threshold levels in a consistent manner. For example, read operations in some weaker or degraded areas may be stopped when the aggregated read errors in these weaker areas exceed a critical ceiling number. These read operations may be resumed after the corresponding information in the weaker or degraded areas is relocated to other flash regions.

At the block level, for example, I/O operations may be scheduled to shift from using both fast and slow pages to only using fast pages. In some implementations, fast pages may have an associated I/O latency on the order of 400 μs while the slow pages may generally have an associated I/O latency of less than about 2 ms.

In the context of a write path on a NVRAM-based storage subsystem, two write modes exist, namely, synchronous writes and asynchronous writes. "Synchronous writes" block the application program or operating system-issued I/O operation till the data contents have been written into persistent flash storage. Such writes may occur at the granularity of write pages (e.g., 2K-16 KB per device), multiplied by the number of planes (e.g., two in some implementations), and multiplied by the stripe factor (e.g., up to eight in some implementations).

On the other hand, "asynchronous writes" may rely on controller memory resources (either in the slave or master controller) and the device power-fail safety mechanisms (which may provide a consistency guarantee mechanism so that data residing in the controller resources are written out to persistent flash storage in the event of a power loss event). In such cases, the write operation may be deemed complete as soon as the data is received in the controller memory resources and much earlier than when the data is actually persisted in flash.

Asynchronous write paths may be used for write requests that involve data whose granularity is equal or larger to a FTL translation granularity (e.g., 4 KB in some implementations). The FTL translation granularity is the granularity at which the FTL remaps the logical block addresses supplied by the operating system (OS) to internal physical flash addresses on the flash media. In particular, an asynchronous write may involve writing the request data contents to the controller resources, and then declaring the write done while filling the remainder of an erase block (and the persistent flash mapped to this erase block) allocated to serve the particular request. In other words, the asynchronous write is performed without formal confirmation that the request data contents have been completely written to a NVRAM device of the NVRAM-based storage subsystem. The erase block may include a total of page*num_planes*stripe_factor bytes of data. The filling may be performed in the background while the application may proceed to other tasks—hence the name "asynchronous."

The write flow may include choosing persistent flash physical locations to absorb the writes—different location choices would result in different flash packages being used, and therefore different slave controllers being involved in the write operation.

A write amplification phenomenon can be somewhat unique to the I/O operation of a NVRAM device with flash memory media. Write amplification refers to a situation in which a number of additional media writes may need to be realized in order to support a write request from the user application 101. This write request from the user application 101 may, for example, write one page of data to the NVRAM device for permanent storage. Write amplification may be expressed as an amplification ratio to connote the additional media writes performed in order to support a given write request. For current leading NVRAM devices, write amplification ratios typically range from about 2.5 to 3.5 in worst case scenarios. The additional media writes may occur before the media writes to flush the data contents of the given write request to permanent storage on the NVRAM devices. For example, the additional media writes may be required to relocate valid data in an erase block to make room on the NVRAM devices such that a contiguous space becomes available for writing the data contents of the particular write page. The additional media writes may also occur during or after the media writes to flush the data contents of the given write request to permanent storage on the NVRAM devices. For example, a smaller user write of example granularity 1 KB may result in a larger unit of data of example granularity 4 KB being written to permanent storage on the NVRAM devices. Similarly, the additional media writes may involve resetting invalid data stored elsewhere on the NVRAM devices after flushing the data contents of the given write request to a particular location on the NVRAM device for permanent storage.

When writing new data contents of an incoming write request to a specific location on flash memory media, pre-existing data already stored at the specific location may need to be relocated to a new location before the new data contents can be written to the specific location. In some implementations, relocating pre-existing data to new locations to free up the old locations occupied by the pre-existing data may be performed in parallel with directing current writes to locations on flash memory media that are already freed up. The parallel implementations may improve the concurrency of the I/O operations on the NVRAM device in that incoming new write requests may be completed without having to wait for relocation operations to complete.

As an illustration, consider a hypothetical NVRAM device having 100 units of storage space ranging from page 0 to page 99. The storage capacity of the hypothetical NVRAM device may be advertised as 70 pages, even though it has 100 pages physically available. As the flash memory media of the NVRAM device is being filled up in response to write requests, an incoming write request in the write log may now reach page 80. At this time, the write log may be scanned to identify pages in the 0 to 80 range that correspond to flash memory cells that have become available for storing the new data contents. The data contents in these available flash memory cells may be displaced for various reasons. Because the advertised capacity is only 70 units, it can be expected, for example, that there are at least pages in the 0 to 80 range, which contain invalid data that can be, or has been, garbage collected. For similar reasons, it can be expected that there are more than 10 locations in the 0 to 80 range that contain data that can be, or has been relocated elsewhere on the NVRAM. When relocating the data contents in the identified locations, only valid data need to be relocated. Valid data means data that has not been overwritten or removed. Invalid data means data that has been overwritten or removed. Thus, while at page 80 and in response to new write request, the write log may be scanned to identify locations in the lower range (e.g., lower than page 80) for entry of the new data contents in the new write request. Once the locations on the NVRAM device have been identified, these locations in the lower range (lower than page 80) may be made available for entry of new data contents. Because of the advertised capacity of 70 pages (out of 100 pages that are physically available) and the additional operations of relocating data into new locations elsewhere on the NVRAM device, the expectation is that the relocation and the associated clean-up operations actually impact more than the area on the NVRAM device allocated to receive final entry of the data contents in the write request, thereby leading to more write operations on the flash memory media. In this hypothetical NVRAM of 100 pages but advertised with a storage capacity of 70 pages, the expected ratio of valid to invalid data entry in the worst case is that for every 10 units, 3 units may contain invalid data while 7 units contain valid data. In the hypothetical of reaching page 80 in the write log, scanning the write log may reveal invalid data in 30 pages (out of the 100 pages). This means the hypothetical NVRAM device may take 30 new write pages. For the NVRAM device to absorb the 30 new writes pages, however, additional writes may be warranted because of the need to relocate valid data. Thus, although the hypothetical NVRAM device is only advertised at 70% of its physical capacity, field use may fill up the entire physical storage due to relocation of valid data and garbage collection, leading to more write operations.

As discussed above, erase operations on the flash memory media of a NVRAM device may be performed per erase block, write operations may be performed per write page, and read operations may be performed per read page. One erase block may be the size of several write pages. One write page may be the size of several read pages. On a per-die basis, a write page is of the range about 2 KB-16 KB. For write operations with a moderate granularity of 4 kB, illustrative write amplification ratios may be in the range from about 2 to about 2.5.

Figure 5:
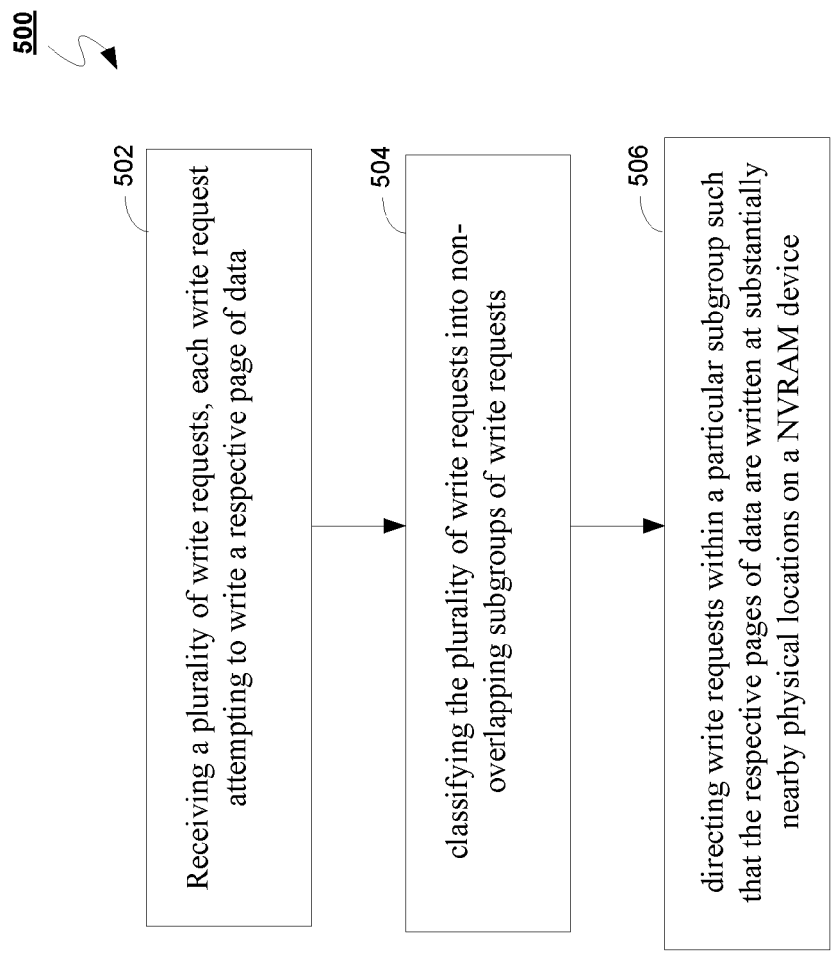
FIG. 5 is a flow chart of a method for reducing write amplification overhead according to some implementations.

FIG. 5 is a flow chart of a method for reducing write amplification overhead according to some implementations. A multitude of write requests may be received, with each write request attempting to write a respective page of data to the NVRAM device 502). The respective page may be in logic units of write pages.

The in-bound write requests may be classified into different subgroups of write requests (504). The subgroups of write requests may not overlap in the sense that the subgroups do not share write requests. The subgroups are classified to improve the overall write performance measured in terms of, for example, latency and/or throughout. Several factors may impact the aggregate write-amplification overhead and hence the overall write performance on a NVRAM device. These factors include the flash media blocks that are the target locations of the write requests, as well as the underlying write mechanism to implement the write requests on the flash media. Initially, active erase blocks may be chosen to form a pool of candidate erase blocks. Active erase block may be an erase block ready to serve an in-bound write-request. The pool of candidate erase blocks may represent the largest containers to which write operations are directed. Subsequently, one active erase block may be chosen to serve a particular in-bound write-request, as discussed below.

When serving an in-bound write request to write, for example, one particular write page associated with the write request, an erase block may be chosen from a pool of candidate erase blocks on the flash media. This choice may be based on any of the following example considerations, namely, the amount of valid data on the candidate erase blocks, the level of parallelism across active erase blocks, and the correlation of expected lifetime of the data written to the active erase blocks. The amount of valid data may represent the amount of relocation overhead associated with a given candidate erase block. The level of parallelism across the active erase blocks may indicate the extent to which the slave controllers and flash resources on each NVRAM device are occupied. In particular, the level of parallelism across active erase blocks may indicate a load distribution across the active erase blocks. The expected life-time of the data written to the active erase blocks may indicate how soon the data may become invalid.

In some implementations, the choice of the next erase block to activate, i.e., use for storing the data of write requests, on the flash media may further factor in the consideration of wear leveling. In other words, the erase block may be chosen to substantially even out the wear and tear on all candidate erase blocks. For example, an erase count may be tracked for each of the candidate erase blocks in the pool. The erase count may indicate the number of times the corresponding erase block has undergone an erase operation. If the erase count of a particular candidate erase block indicates that this particular candidate erase block has underwent erase operations substantially less than comparable candidate erase blocks in the pool, then this particular candidate erase block may be chosen even though, for example, it may have been recently chosen for activation. For example, an erase count of less than 50% of the average erase count in a given pool of candidate erase blocks may indicate that a particular erase block is an outlier on this count of wear-and-tear.

For context, an erase block may undergo the following life cycle. Initially, a particular erase block may be clean, i.e., erased and ready to be used to serve write requests. Thereafter, the particular erase block may become active when it is chosen in response to an incoming write request. Incoming write requests may then be served by writing their data contents sequentially on the erase block. Sequential write may avoid gaps in filling the space before the next garbage collection for the erase block. Sequential write may also be advantageous for writing data contents on modern MLC NAND flash when writes to locations within an erase block "disturbs" the contents at other locations. In particular, the MLC read algorithms may factor in the write "disturb" for (and only for) top-to-bottom write patterns, like those in a sequential write. Later on, the particular erase block may become passive when it is fully written and with no more free space left. The passive erase block may then be selected for garbage collection, i.e., selected as a source of relocation. When the relocation is complete, the passive erase block may be ready for an erase operation to have all data contents removed. Once the erase operation is done, the erase block becomes clean.

In other implementations, the choice of the erase block to activate on the flash media may factor in the consideration of load balancing. In particular, the erase block may be chosen to substantially flatten the utilization of resources associated with all candidate erase blocks. For example, each erase block may be tracked for a utilization of the associated resources, which may include, for example, the direct memory access (DMA) channel associated with the erase block on the flash media. If the tracked utilization indicates a particular candidate erase block on the flash media has an under-utilized resource, then this particular candidate erase block may be favored even though other considerations would not favor this particular candidate erase block (e.g., higher erase count than other candidates in the candidate pool).

Once the active erase block is chosen, the write page within the erase block to use next may be selected. Subsequently, for the selected write page within the chosen erase block, a particular write mechanism, for example, a synchronous write, an asynchronous write, etc., may be chosen, as discussed below.

In some implementations, write requests may be grouped according to the expected life-time of the associated data contents so that different groups of write requests are channeled to different target locations on the flash media. The data contents of the write requests for different groups may differ in the expected life time. In other words, some groups of write requests may include write requests with associated data contents that become invalid, i.e., get replaced with more up-to-date versions, more quickly. Fast-changing data may be generated by, for example, on-line trading platforms, social networking media sites, a news feed, etc. Other groups of write requests may include write requests with associated data contents that remain valid for long durations of time before they are updated. Examples of slowing changing sticky data may include back-up data of a campus network or at a data storage center.

Fast-changing data can create a lot of invalid locations on the flash memory media when they are overwritten and therefore are good candidates for garbage collection to obtain more free space on the flash memory media. In contrast, writing slowly-changing sticky data to NVRAM may incur fairly high write amplification overheads. Because slowly changing data tends to have fewer invalid bits that have been altered since the last write to the NVRAM, such data may tend to get relocated multiple times, as part of multiple garbage collection passes.

For example, write requests within one subgroup may be directed to the flash media such that the respective pages of data are written at substantially nearby physical target locations on the flash media (506). In comparison, write requests from different subgroups may be written to physical target locations on the flash media that are separated by a distance of memory locations. This distance of memory locations may be otherwise filled in the absence of the categorization into subgroups. By clustering the data contents with comparable expected life time at nearby target locations on the flash media, for example on the same erase block, one may improve the efficiency of garbage collection operations involving that erase block. Specifically, by virtue of the correlation between expected life times for the constituent blocks, the erase block is more likely to include more invalid data at a particular time down the road when a subset of the blocks have become invalid. As a result, subsequent erase operations, for example, issued during a garbage collection process, may more likely recapture more available space while incurring less relocation overhead to relocate valid data. In particular, the data contents of write requests of one group may be clustered in one erase block, as determined by one or more of the NVRAM controllers (e.g., master controller 220, slave controllers 202, 204, 206, 208, 210, 212, 214, 216, and 218 as illustrated in FIG. 2). The data contents of write requests of one group may also be clustered in neighboring or adjacent erase blocks. These different target locations on the flash media may also be referred to as the target flash media blocks.

In some implementations, the write requests in the write log may be correlated with the characteristics of the target flash media, which also can impact write performance. Different areas of flash media may have different write metrics, for example, the fast pages within an erase block on an MLC flash memory media may allow faster writes than slow pages within the erase block. As an illustration, write to a fast page may take, for example, about 400 μs while a write operation of a comparable size on the slow page can take 2 ms. The difference between the slow page and the fast page may be caused by different flash write algorithms and underlying cell arrangements. For example, a fast page, corresponding to the first write in a multi-bit MLC cell, may be programmed using a flash write algorithm similar to the one used for an SLC type flash memory cell while the programming of slow pages, corresponding to the second and subsequent bits in a multi-bit MLC cell, may need to be performed more carefully so as to not unduly disturb the data contents of previously written pages associated with those cells. Some implementations can make intelligent choices to avoid writing to slow storage cells in order to more quickly process a heavy volume of inbound write requests (e.g., to improve latency in a write-through operation or throughput of data volume). In particular, when an excess storage capacity exists on the NVRAM, write requests may be redirected to flash memory media cells on fast pages and away from the flash memory media cells on slow pages. This redirection may improve I/O performance as measured in throughput or latency. When excess capacity is at a premium, however, write requests may be redirected to flash memory media cells on both fast and slow pages. For example, these implementations may schedule the execution of the in-bound write request such that utilization of available flash memory media cells of the NVRAM device may be substantially maximized.

Some implementations can flexibly decide avoiding directing new write operations to the flash memory media cells on slow pages in order to achieve a trade-off between the latency of serving inbound write requests and the utilization of available storage capacity on NVRAM device. The trade-off may depend on, for example, the ratio of available excessive capacity on the NVRAM device relative to the volume of data in the inbound write requests. When the ratio is high, a scheduler may be more aggressive in redirecting writes to flash memory media cells on fast pages while forgoing writing to the flash memory media cells on slow pages. For example, when the ratio is more than about 2, more than 50% of writes to the flash memory media cells on slow pages may be redirected to flash memory media cells on the fast page. When the ratio is low, a scheduler may be more conservative in redirecting writes to flash memory media cells on fast pages while forgoing writing to the flash memory media cells on slow pages. For example, when the ratio lower than about 1.5, less than 50% of writes to the flash memory media cells on slow pages may be redirected to flash memory media cells on the fast pages. The trade-off also may depend on the application context. For example, for data intensive applications demanding quick response times for outstanding write operations, such as high-frequency electronic trading applications, the scheduler may be more aggressive in redirecting writes to flash memory media cells on fast pages while forgoing writing to the flash memory media cells on slow pages. In other example applications such as an email storage system, media (including photo, video, and audio) repertoire system, etc., where there is a quota of available storage and the overarching requirement is to maximize space utilization, the scheduler may be less aggressive in redirecting writes to flash memory media cells on fast pages while forgoing writing to the flash memory media cells on slow pages.

In sum, some implementations intelligently schedule the write requests in the write log to write to some or all of the flash write pages within the active erase blocks to improve write performance in handling in-bound write requests.

Some implementations may additionally separate the write paths of large and small write requests, i.e., the mechanism used to persist the request data in the selected write page, so as to strike a balance of throughput and latency. Referring to FIGS. 1 and 2, user application 101 may submit a write request to device driver 125 through operating system 102. Thereafter, device driver 125 communicates with master controller 220 to execute the write request. When the write request has been completed, master controller 220 may notify user application 101 through operating system 102. From the perspective of user application 101, the time between the submission of the write request and the completion of the write request characterizes a latency of the write request. Illustrative latency for a write request on a NVRAM device can range from about 500 μs to about 2.2 ms, depending on the speed of the underlying flash memory media. The latency may be exacerbated if the write request is completed after write retry at the flash memory media. For most user applications, these illustrative latency numbers present a slow write.

Figure 6:
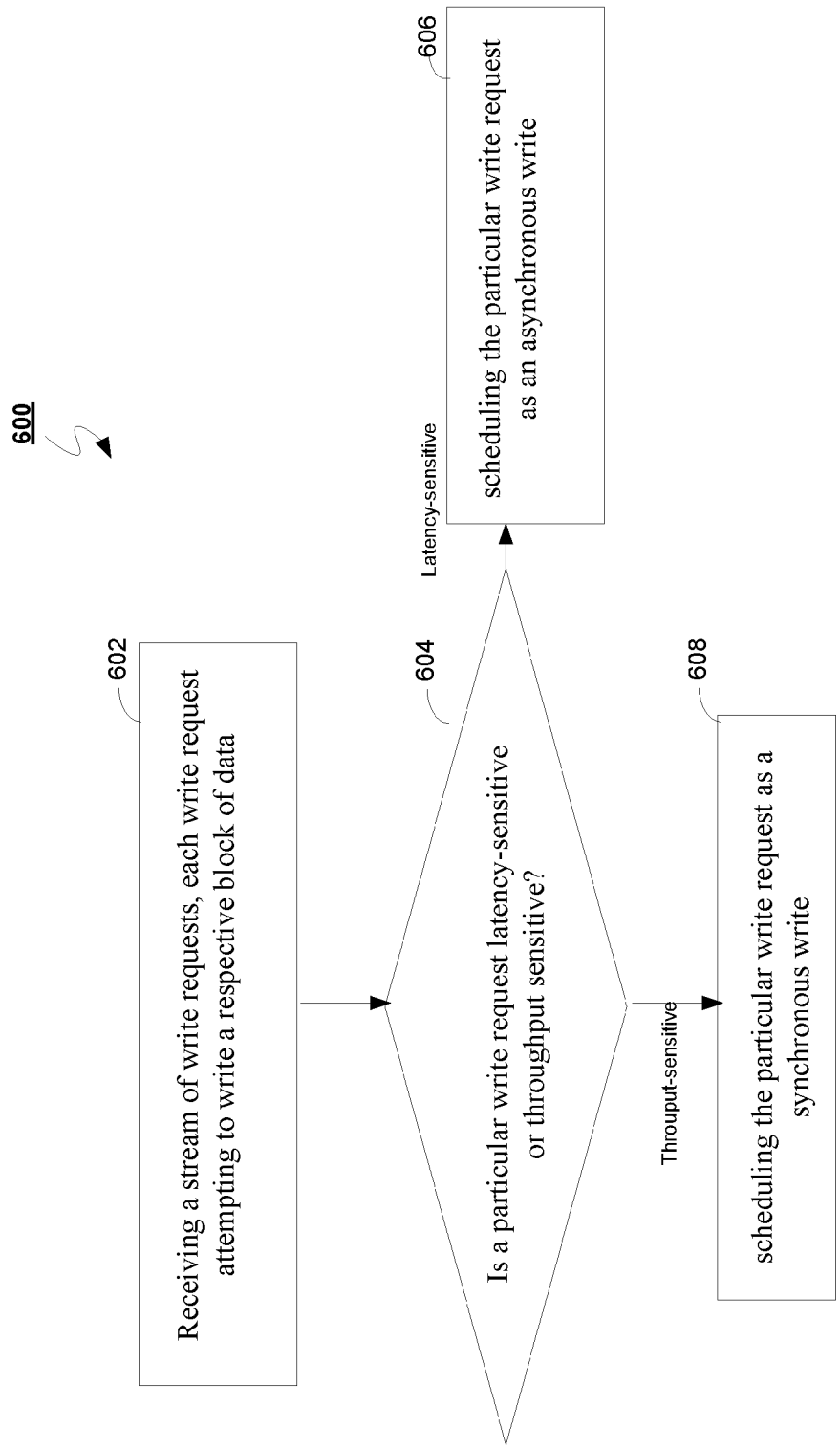
FIG. 6 is a flow chart of a method for differential scheduling of in-bound write requests based on the respective characterizations of each in-bound write request.

FIG. 6 is a flow chart of a method for differential scheduling of in-bound write requests based on the respective characterizations of each in-bound write request. A stream of write requests may be received with each write request attempting to write a respective page of data to the flash media on the NVRAM device (602). Each in-bound write request may then be classified as latency sensitive or through-put sensitive (604). For example, some implementations may ascertain, with the write log, whether there is only one high level thread or application process that that is issuing the write requests, or whether there are multiple threads of user applications issuing a lot of write requests to flash memory media at one time. In the case of one (or a small number of) high level thread or application process issuing the multitude of write requests in the write log, the response time performance is more likely to matter and hence such write requests may be classified as latency-sensitive. Such scenarios may include, for example, high frequency trading platforms to accommodate voluminous trading orders on the fly being committed by a relatively small number of threads. In the case of multiple threads of user applications issuing a lot of write requests to flash memory media at one time, throughput concerns may be paramount in the sense that the aggregate of these write requests need to be processed in as short a time as possible. An example of such activity may be found, for example, in a back-up file server application attempting to back up files on work-stations across a campus network. These write requests, therefore, may be classified as throughput sensitive. Referring to FIG. 2, depending upon the context in which the write requests have been issued as discussed above, master controller 220 working with the device driver 125 may infer internally whether the write requests are more likely to be latency sensitive or through-put sensitive. Master controller 220 may then schedule the write requests according to the inference to tailor to the specific needs of the context. For example, if a particular write request is classified as latency sensitive, master controller 220 may schedule the particular write request as an asynchronous write (606). If, however, a given write request is classified as throughput-sensitive, master controller 220 may schedule the given write request as a synchronous write (608).

Specifically, the implementations may infer that one or more write requests are latency or throughput sensitive based on the block size associated with the write requests. The block size associated with the write requests can be indicative of the overall application expectations associated with the write request. For example, a vital write for updating a database log may be a 4 KB write. Similarly, the same database application may issue a 128 KB write, which is a relatively large block size. A 4 KB write is a small write for which latency matters more whereas 128 KB write is a large write for which throughput is premium. Some implementations may categorize write requests into block size ranges, and then associate latency or throughput sensitivity or a combination with a given range. Illustrative block size ranges may include ultra-small blocks (USBs), regular blocks, and large blocks. For example, requests in the USB range may be smaller than 4 KB for which latency concerns are paramount. Similarly, a regular block range may include requests with block sizes between 4 KB and 128 KB. For regular blocks, latency and bandwidth/throughput concerns are both important. Additionally, large block ranges may be made up of requests exceeding 128 KB in size. For large block requests, bandwidth/throughput considerations tend to outweigh latency concerns.

Some implementations may differentiate write requests in the write log based on whether a particular write request commits metadata or data in small blocks where latency is premium, or whether the write request commits large chunk of data where throughput matters more. For small and medium write requests, an asynchronous-style write operation may be employed to realize a write-behind scenario, in which the small write is committed to SRAM buffer resources in the master or slave controllers, while the issuing thread continues without waiting for the completion of data transfer from the SRAM buffer to flash. An example asynchronous I/O operation may capture the write request, and write to SRAM and return an acknowledgement to the requesting thread in roughly 50 microseconds. Meanwhile, the driver, perceiving that the write has completed, continues to process further writes, rather than delaying the same. For large write requests, the controller may commit the large write directly to flash, the large write may still pass through the SRAM buffer, but the issue thread stalls because the SRAM buffer does not confirm the storage of data and the controller is engaged in the write-commit until the write is committed to flash, as if the SRAM buffer is not there, hence, resulting in a synchronous write.

Some implementations may ascertain whether a write is requested by a user application or by a kernel (or controller) module in order to achieve a better trade-off between throughput and latency. Internal kernel- or controller-module level requests tend to be related to meta-data writes, and are usually latency sensitive.

Figure 7:
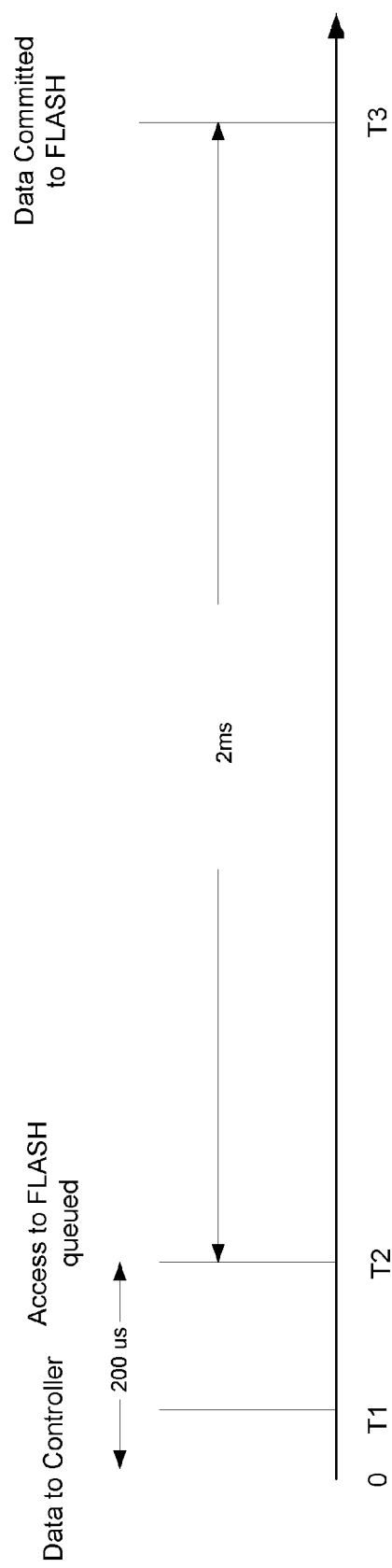
FIG. 7 is a timing diagram illustrating the latency of I/O operations on the NVRAM according to some implementations.

FIG. 7 is a timing diagram illustrating the latency of I/O operations on the NVRAM according to some implementations. The NVRAM device may employ MLC type NAND flash memory media, as discussed above. At time T1, an I/O request is received at a controller on an NVRAM device, including the time to transfer the data contents of the request into internal volatile memory resources within the controller. The controller may be either a master controller 220 or any of the slave controllers. The request may be a WRITE request to commit a WRITE page (block) of, for example, 2 k-16 k bytes of data to flash memory media on the NVRAM device. At time T2, the request to access the underlying flash memory media is queued by the controller. At time T3, data of the WRITE page (block) is committed to the underlying flash memory media. For an ERASE request, data is erased from a specified memory location at time T3. For a READ request, data is fetched from a specified memory location at time T3. For illustration, T2 may be under 200 µs while T3 may be around 2 ms for slower pages and 400 µs for faster pages, as discussed above.

Referring back to FIG. 7, from time 0 to T1, the write request is received at master controller 220. Allowing the issuing thread or process to continue at time T1 would favor latency the most. From time T1 to T2, the write request may be transmitted from master controller 220 to a particular flash plane. This duration may be up to 200 µs during which the write operation is blocked. Allowing the issuing thread or application process to continue at T2 would be a trade-off between latency and through-put/bandwidth. In such implementations, where the write request is acknowledged either after time T1 (once the data contents are received in controller volatile memory) or at time T2 (once the data contents are transmitted to the flash device but not yet committed), data consistency may be maintained by a combination of hardware and software mechanisms. In particular, if there is a power outage, on-board circuits (for example, capacitor circuits) may provide power to both complete queued writes as well as write out the data contents in controller volatile memory to the flash media of the NVRAM device. Similarly, in some implementations, post-power fail recovery mechanisms in software may reconstruct a consistent state of the system by inspecting the written-out contents. From time T2 to T3, the write request has been executed, the I/O operation is thus unblocked and an ACK message or exception may be received at the issuing thread or application process. The duration may be, for example, about 2 ms. Requesting the issuing thread to wait until T3 would favor throughput (or consistency) the most. At this time, data has been committed to permanent storage at relevant flash memory cells.

Some implementations can provide power-safe mechanism by relying on automatic hardware-assisted flushing of data stored in SRAM or DRAM on the NVRAM device to pre-specified flash memory location on a power outage event. In these implementations, SRAM or DRAM on NVRAM device can be used as intermediary storage so that aggregated writes can be performed in a manner that strikes a balance between latency and throughput, depending on hardware resources limits, application contexts, etc.

Figure 8:
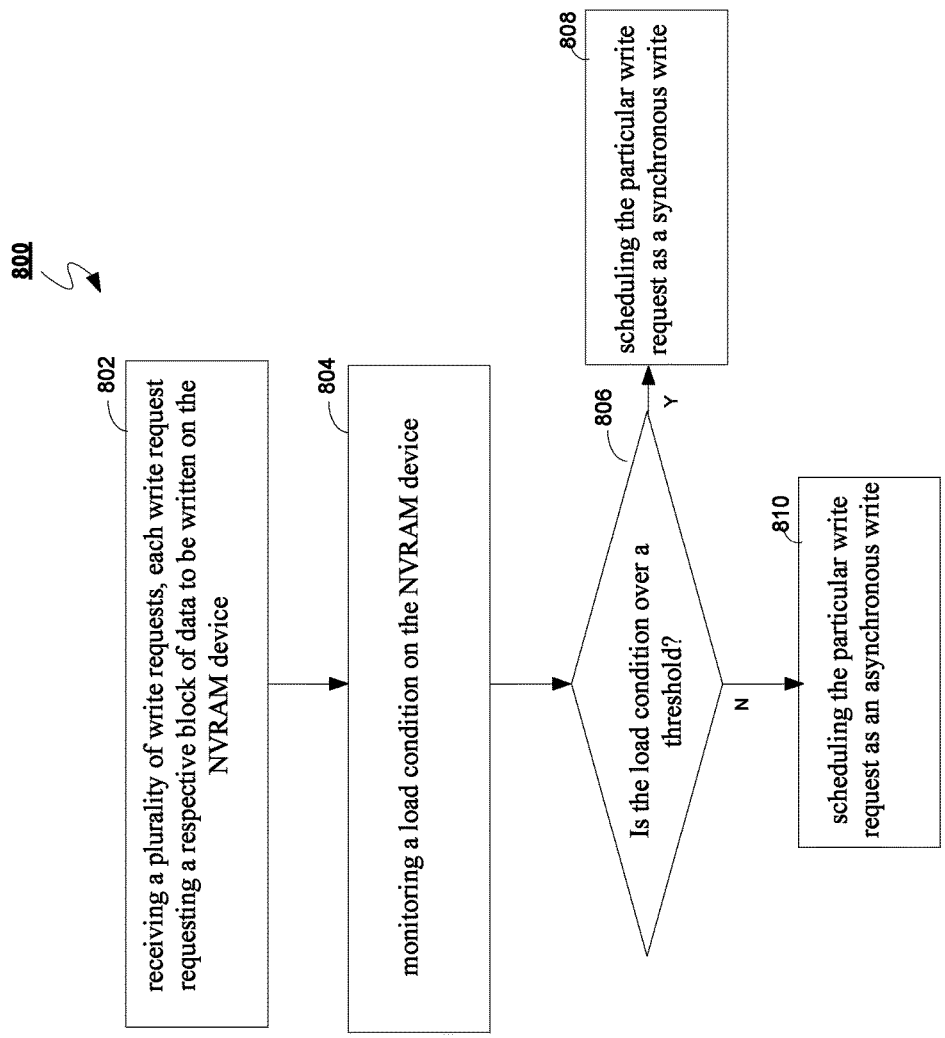
FIG. 8 is a flow chart of a method for differential scheduling of in-bound write requests based on the load condition on the target NVRAM device.

FIG. 8 is a flow chart of a method for differential scheduling of in-bound write requests based on the load condition on the target NVRAM device. A plurality of write requests may be received, with each write request requesting a respective block of data to be written on the NVRAM device (802). The page of data may be in the unit of a write page, as discussed above. Meanwhile, the load condition on the NVRAM device is being monitored (804). Facing a multitude of write requests, a write concurrency determination may be made based on a number of load condition factors. The load condition factors may include the number of write requests the users of a NVRAM device are injecting into the device. The load condition factors may further include the number of threads or application processes issuing those write requests. The load condition factors also may include the number of threads or application processes running on the system as one indication of whether the system is under high loading condition or low loading condition.

The load condition factors may additionally include queue occupancy ratios. The queue occupancy ratio may be directed to a queue of pending write requests at a controller on the NVRAM device, including master controller 220, slave controllers 202, 204, 206, 208, 210, 212, 214, 216, and 218. The queue occupancy ratio may also be directed to a queue of pending write requests at a device driver on the host computing device on which the NVRAM device is mounted. A queue occupancy ratio may detect whether a particular queue of write requests has more than a threshold number of entries. Some implementations may treat requests from individual threads or application processes as internal queues. By inspecting how occupied the queues are and then trying to estimate what the arrival rate of the write request is and the number of write requests that are present in the system at any given time, the loading condition of the system can be estimated and characterized The load condition may then be compared to a threshold (806). For example, a queue occupancy ratio may be compared to a threshold ratio to ascertain whether the flash media of an underlying NVRAM device is serving a heavy volume of I/O access requests. If the load condition is over the threshold (for example, the queue occupancy ratio is over a threshold ratio), the in-bound write requests may be scheduled as synchronous writes (808), as discussed above. By scheduling the in-bound write requests as synchronous writes, enqueue operations may be slowed and dampen further build-up of pending I/O requests because the issuing processes wait for the in-bound write request to complete and may not issue further write requests. If, however, the load condition is under the threshold (for example, the queue occupancy ratio is within the threshold ratio), then the in-bound write requests may be scheduled as asynchronous writes (810) since the underlying NVRAM may take on more I/O tasks.

In a system with a heavy backlog of pending threads or application processes, or high thread count, some implementations may abort the pursuit of write-behind through the SRAM buffer as an intermediary storage place holder because latency may not be reduced through the SRAM buffer. In some implementations, the device driver 125, as shown in FIG. 1, can push data of the write requests to flash as if the intermediary SRAM does not exist.

Some implementations may discriminate based on, whether a lot of write requests come from a small number of threads or a lot of threads are issuing lots of write requests. In some implementations, I/O request parameters are known, for example, the identity of the requesting thread or application process, the block size of data for each write request. Some implementations may query operating system 102 through API 122 for such information.

Some implementations may need to infer the number of threads or application processes that are actively making write requests, or the number of threads or application processes currently running on the system (i.e., not idling). Some implementations may query operating system 102 through API 122 for information to make the above inferences.

In some implementations, the same write operation, say an application issuing a 4 KB write request, can end up taking different parts at different times based on the surrounding context. Sometimes, the 4 KB data write may be treated as a latency sensitive operation. For example, mission critical writes may be committed immediately to flash memory media even if these writes are quite light in quantity. For example, excessive storage capacity may exist at the flash memory media so that latency may be easily addressed by directing the write to a fast page as described earlier. At other times, the 4 KB write may be treated as part of a medium block size for which the write operation may be unblocked at time T2 while the issuing thread or application process is allowed to continue. At yet other times, the 4 KB data may be treated as part of a bundle that is to be committed to flash memory media at a later time. In addition to the work load characteristics, the determination may consider the state of the system, for example, how stressed are the flash resources. For instance, if a lot of flash resources available with relatively few write requests pending, the write will end up using the fast pages. Similarly, under relatively light loads, even larger writes will end up using the latency sensitive write path.

The discussions herein also apply to co-pending read and write operations. Consistent with the discussion above, some implementations may prioritize reads over writes because reads can be less computationally burdensome except for those circumstances where certain reads depend on writes, in which cases the write operations are prioritized. In NAND type of flash memory media, some implementations may reduce the number of media writes to substantially minimize cell failure due to media wear off.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of managing a hosted non-volatile random-access memory (NVRAM) storage subsystem that includes NVRAM devices, the method comprising:

in response to receiving, at a device driver on the host computing device, a plurality of write requests each requesting to write a respective unit of data to the NVRAM-based storage subsystem, identifying each application process or thread that has issued a particular write request;

based on results of the identification, classifying each write request into either a first subgroup of write requests or a second subgroup of write requests in which a smaller amount of data is being accessed by the first subgroup of write requests as issued from the corresponding application process or thread than the second subgroup of write requests as issued from the corresponding application process or thread; and identifying target locations on at least one NVRAM device of the NVRAM-based storage subsystem such that the first subgroup of write requests and the second subgroup of write requests are serviced at different target locations on the at least one NVRAM device, the NVRAM-based storage subsystem in communication with an intermediate volatile storage.

2. The method of claim 1, wherein classifying each write request into either a first subgroup of write requests or a second subgroup of write requests comprises determining whether a particular write request of the plurality of write requests is latency-sensitive, and wherein a write request is latency-sensitive when the write request is to be serviced upon receipt with substantially zero delay.

3. The method of claim 2, wherein determining whether a particular write request of the plurality of write requests is latency-sensitive comprises determining whether the write request is to be serviced as soon as possible upon receipt.

4. The method of claim 2, wherein determining whether a particular write request of the plurality of write requests is latency-sensitive comprises determining whether the write request is to be serviced with a higher priority than write requests determined as not latency-sensitive.

5. The method of claim 2, wherein determining whether a particular written request of the plurality of write request is latency-sensitive comprises determining whether the write request is to be serviced at the next available time instant.

6. The method of claim 2, wherein determining whether the particular write requests is latency sensitive further comprises:
   ascertaining a block size of the respective unit of data to be written per the particular write request; and
   identifying an application process or thread that has issued the write request.

7. The method of claim 2, further comprising:
   based on determining that the particular write request is latency-sensitive, scheduling the particular write request as an asynchronous write to the NVRAM-based storage subsystem, wherein the asynchronous write is carried out by sending the respective unit of data to the intermediate volatile storage and without confirming that the respective unit of data of the write request has been completely written to the target location on the at least one NVRAM device of the NVRAM-based storage subsystem.

8. The method of claim 1, wherein classifying each write request into either a first subgroup of write requests or a second subgroup of write requests comprises determining whether a particular write request of the plurality of write requests is throughput-sensitive, and wherein a write request is throughput sensitive when the respective unit of data is to be written to a corresponding target location on a NVRAM device of the NVRAM-based storage subsystem while bypassing the intermediate storage in communication with the NVRAM-based storage subsystem.

9. The method of claim 8, wherein determining whether the particular write request is throughput sensitive further comprises:
   ascertaining a block size of the respective unit of data to be written per the particular write request; and
   identifying an application process or thread that has issued the write request.

10. The method of claim 8, further comprising:
    based on determining that the particular write request is throughput-sensitive, scheduling the particular write request as a synchronous write to the NVRAM-based storage subsystem, wherein the synchronous write is performed by blocking an application process or thread on a computing device hosting the NVRAM-based storage subsystem that has issued the particular write request until the respective unit of data has been completely written to the at least one NVRAM device of the NVRAM-based storage subsystem.

11. The method of claim 1, wherein classifying each write request into either a first subgroup of write requests or a second subgroup of write requests comprises determining whether a particular write request of the plurality of write requests is latency-sensitive or throughput-sensitive;
    wherein a subgroup of write requests categorized as latency-sensitive comprises write requests issued by a first set of application processes or threads on the host computing device,
    wherein a subgroup of write requests categorized as throughput-sensitive comprises write requests issued by a second set of application processes or threads on the host computing device, and
    wherein the first set of application processes or threads are smaller in size than the second set of application processes or threads.

12. The method of claim 1, wherein classifying each write request into either a first subgroup of write requests or a second subgroup of write requests comprises determining whether a particular write request of the plurality of write requests is latency-sensitive or throughput-sensitive,
    wherein a subgroup of write requests categorized as latency-sensitive comprises write requests issued by a first set of application processes or threads on the host computing device,
    wherein a subgroup of write requests categorized as throughput-sensitive comprises write requests issued by a second set of application processes or threads on the host computing device, and
    wherein the second set of application processes or threads generate substantially more counts of write requests than the first set of application processes or threads.

13. A system comprising a non-volatile random-access memory (NVRAM) based storage subsystem, the NVRAM-based storage subsystem comprising at least one NVRAM device in communication with a host computing device, the NVRAM-based storage subsystem is configured to perform the operations of:
    in response to receiving, at a device driver on the host computing device, a plurality of write requests each requesting to write a respective unit of data to the NVRAM-based storage subsystem, identifying each application process or thread that has issued a particular write request;
    based on results of the identification, classifying each write request into either a first subgroup of write requests or a second subgroup of write requests in which a smaller amount of data is being accessed by the first subgroup of write requests as issued from the corresponding application process or thread than the second subgroup of write requests as issued from the corresponding application process or thread; and
    identifying target locations on at least one NVRAM device of the NVRAM-based storage subsystem such that the first subgroup of write requests and the second subgroup of write requests are serviced at different target locations on the at least one NVRAM device, the NVRAM-based storage subsystem in communication with an intermediate volatile storage.

14. The system of claim 13, wherein classifying each write request into either a first subgroup of write requests or a second subgroup of write requests comprises determining whether a particular write request of the plurality of write requests is latency-sensitive, and wherein a write request is latency-sensitive when the write request is to be serviced upon receipt with substantially zero delay.

15. The system of claim 14, wherein determining whether a particular write request of the plurality of write requests is latency-sensitive comprises determining whether the write request is to be serviced as soon as possible upon receipt.

16. The system of claim 14, wherein determining whether a particular write request of the plurality of write requests is latency-sensitive comprises determining whether the write request is to be serviced with a higher priority than write requests determined as not latency-sensitive.

17. The system of claim 14, wherein determining whether a particular written request of the plurality of write request is latency-sensitive comprises determining whether the write request is to be serviced at the next available time instant.

18. The system of claim 14, wherein determining whether the particular write requests is latency sensitive further comprises:
   ascertaining a block size of the respective unit of data to be written per the particular write request; and
   identifying an application process or thread that has issued the write request.

19. The system of claim 18, wherein the operations further comprise:
   based on determining that the particular write request is throughput-sensitive, scheduling the particular write request as a synchronous write to the NVRAM-based storage subsystem,
   wherein the synchronous write is performed by blocking an application process or thread on a computing device hosting the NVRAM-based storage subsystem that has issued the particular write request until the respective unit of data has been completely written to the at least one NVRAM device of the NVRAM-based storage subsystem.

20. The system of claim 14, wherein the operations further comprise:
   based on determining that the particular write request is latency-sensitive, scheduling the particular write request as an asynchronous write to the NVRAM-based storage subsystem, wherein the asynchronous write is carried out by sending the respective unit of data to the intermediate volatile storage and without confirming that the respective unit of data of the write request has been completely written to the target location on the at least one NVRAM device of the NVRAM-based storage subsystem.

21. The system of claim 13, wherein classifying each write request into either a first subgroup of write requests or a second subgroup of write requests comprises determining whether a particular write request of the plurality of write requests is throughput-sensitive, and wherein a write request is throughput sensitive when the respective unit of data is to be written to a corresponding target location on a NVRAM device of the NVRAM-based storage subsystem while bypassing the intermediate storage in communication with the NVRAM-based storage sub system.

22. The system of claim 21, wherein determining whether the particular write request is throughput sensitive further comprises:
   ascertaining a block size of the respective unit of data to be written per the particular write request; and
   identifying an application process or thread that has issued the write request.

23. The system of claim 13, wherein classifying each write request into either a first subgroup of write requests or a second subgroup of write requests comprises determining whether a particular write request of the plurality of write requests is latency-sensitive or throughput-sensitive,
   wherein a subgroup of write requests categorized as latency-sensitive comprises write requests issued by a first set of application processes or threads on the host computing device,
   wherein a subgroup of write requests categorized as throughput-sensitive comprises write requests issued by a second set of application processes or threads on the host computing device, and
   wherein the first set of application processes or threads are smaller in size than the second set of application processes or threads.

24. The system of claim 13, wherein classifying each write request into either a first subgroup of write requests or a second subgroup of write requests comprises determining whether a particular write request of the plurality of write requests is latency-sensitive or throughput-sensitive,
   wherein a subgroup of write requests categorized as latency-sensitive comprises write requests issued by a first set of application processes or threads on the host computing device,
   wherein a subgroup of write requests categorized as throughput-sensitive comprises write requests issued by a second set of application processes or threads on the host computing device, and
   wherein the second set of application processes or threads generate substantially more counts of write requests than the first set of application processes or threads.

25. A non-transitory computer readable medium, comprising software instructions, which software instructions when executed causes a non-volatile random-access memory (NVRAM) based storage subsystem, which NVRAM based storage subsystem comprising at least one NVRAM device in communication with a host computing device, to perform the operations of:
   in response to receiving, at a device driver on the host computing device, a plurality of write requests each requesting to write a respective unit of data to the NVRAM-based storage subsystem, identifying each application process or thread that has issued a particular write request;
   based on results of the identification, classifying each write request into either a first subgroup of write requests or a second subgroup of write requests in which a smaller amount of data is being accessed by the first subgroup of write requests as issued from the corresponding application process or thread than the second subgroup of write requests as issued from the corresponding application process or thread; and
   identifying target locations on at least one NVRAM device of the NVRAM-based storage subsystem such that the first subgroup of write requests and the second subgroup of write requests are serviced at different target locations on the at least one NVRAM device, the NVRAM-based storage subsystem in communication with an intermediate volatile storage.

* * * * *